(12) United States Patent
Xiong et al.

(10) Patent No.: US 11,557,202 B2
(45) Date of Patent: Jan. 17, 2023

(54) TRAFFIC FLOW CONTROL METHOD AND APPARATUS IN INTERNET OF VEHICLES

(71) Applicant: HUAWEI TECHNOLOGIES CO., LTD., Guangdong (CN)

(72) Inventors: Fuxiang Xiong, Shenzhen (CN); Hui Li, Shenzhen (CN); Jianli Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 68 days.

(21) Appl. No.: 16/872,608

(22) Filed: May 12, 2020

(65) Prior Publication Data

US 2020/0273329 A1 Aug. 27, 2020

Related U.S. Application Data

(63) Continuation of application No. PCT/CN2018/111862, filed on Oct. 25, 2018.

(30) Foreign Application Priority Data

Nov. 13, 2017 (CN) .......................... 201711116441.8

(51) Int. Cl.
*G08G 1/01* (2006.01)
*G08G 1/16* (2006.01)

(52) U.S. Cl.
CPC ......... *G08G 1/0145* (2013.01); *G08G 1/0116* (2013.01); *G08G 1/167* (2013.01)

(58) Field of Classification Search
CPC ..... G08G 1/0145; G08G 1/0116; G08G 1/167
(Continued)

(56) References Cited

U.S. PATENT DOCUMENTS 9,534,910 B2 * 1/2017 Okumura ............... G06V 20/54
2001/0034575 A1 10/2001 Takenaga et al.
(Continued)

FOREIGN PATENT DOCUMENTS

CN 103177596 A 6/2013
CN 103489322 A 1/2014
(Continued)

OTHER PUBLICATIONS

Reza Azimi:"Co-operative Driving at Intersections using Vehicular Networks and Vehicle-Resident Sensing", Carnegie Mellon University, Pittsburgh, PA, Jul. 2015. total 229 pages.

*Primary Examiner* — Kam Wan Ma
(74) *Attorney, Agent, or Firm* — Womble Bond Dickinson (US) LLP

(57) ABSTRACT

The traffic flow control method includes: receiving, by a traffic flow control device, traffic control request signaling sent by an in-vehicle device of a first vehicle, where the traffic control request signaling includes travel information of the first vehicle and a travel intention of the first vehicle; determining, by the traffic flow control device, traffic command signaling based on the traffic control request signaling and traffic control phase information of a target intersection, where the target intersection is an intersection through which the first vehicle is to pass; and sending, by the traffic flow control device, the traffic command signaling to the in-vehicle device of the first vehicle. The traffic flow control method, the traffic flow control device, the in-vehicle device, and the computer-readable storage medium in the internet of vehicles can help a vehicle in the internet of vehicles travel safely and efficiently at an intersection.

18 Claims, 12 Drawing Sheets

(58) Field of Classification Search
USPC .......................................................... 340/916
See application file for complete search history.

(56) References Cited

U.S. PATENT DOCUMENTS

| | | | |
|---|---|---|---|
| 2008/0162027 A1* | 7/2008 | Murphy | G05D 1/0274 |
| | | | 701/1 |
| 2010/0070128 A1* | 3/2010 | Johnson | G08G 1/096883 |
| | | | 701/31.4 |
| 2011/0018701 A1 | 1/2011 | Mizuno | |
| 2013/0194108 A1 | 8/2013 | Lapiotis et al. | |
| 2016/0203717 A1* | 7/2016 | Ginsberg | G08G 1/096883 |
| | | | 701/117 |
| 2017/0154525 A1 | 6/2017 | Zou et al. | |
| 2017/0186314 A1 | 6/2017 | Bernhardt et al. | |

FOREIGN PATENT DOCUMENTS

| | | |
|---|---|---|
| CN | 103714704 A | 4/2014 |
| CN | 105070084 A | 11/2015 |
| CN | 104882008 B | 5/2016 |
| CN | 104123846 B | 2/2017 |
| CN | 106373431 A | 2/2017 |
| CN | 106652493 A | 5/2017 |
| CN | 106781547 A | 5/2017 |
| CN | 106846867 A | 6/2017 |
| CN | 108091155 A | 5/2018 |
| WO | 2016094224 A1 | 6/2016 |

* cited by examiner

TRAFFIC FLOW CONTROL METHOD AND APPARATUS IN INTERNET OF VEHICLES

CROSS-REFERENCE TO RELATED APPLICATIONS

This application is a continuation of International Application No. PCT/CN2018/111862, filed on Oct. 25, 2018, which claims priority to Chinese Patent Application No. 201711116441.8, filed on Nov. 13, 2017. The disclosures of the aforementioned applications are hereby incorporated by reference in their entireties.

TECHNICAL FIELD

This application relates to the field of internet of vehicles, and more specifically, to a traffic flow control method, a traffic flow control device, an in-vehicle device, and a computer-readable storage medium in the internet of vehicles.

BACKGROUND

The internet of vehicles is an intelligent integrated network system that uses a vehicle as a basic information unit and that connects road entities such as a pedestrian, a vehicle, and a roadside facility to a traffic management network, a mobile network, and a backup network by integrating a sensor technology, an information collection technology, an access technology, a transmission technology, and a networking technology. The internet of vehicles provides services for applications such as vehicle security, traffic control, information service, and user network access, and is intended to improve a traffic condition, improve travel efficiency, and expand information interaction.

The internet of vehicles has three characteristics: extensiveness, mobility, and intelligence.

Extensiveness means that a vehicle defined in the internet of vehicles is a broad concept, and includes a vehicle such as an airplane, a ship, and a train. In addition to the vehicle, the internet of vehicles further includes related facilities such as a roadside facility, an in-vehicle sensor, and a data server. For different communications devices and network access manners, the internet of vehicles provides corresponding interfaces.

Mobility is a fundamental characteristic of the internet of vehicles. Continuous movement of vehicles leads to a complex and highly dynamic topology structure of the internet of vehicles. The internet of vehicles can provide one or more interfaces for a user at any location to meet a communication requirement of the user for accessing the Internet, thereby implementing a real-time data service between a vehicle and an internet of vehicles server.

Intelligence means that the internet of vehicles can proactively obtain information about a vehicle and a road condition in real time by using various sensors and respond accordingly, instead of passively collecting information and waiting for the information to be processed.

How a vehicle in the internet of vehicles goes through an intersection is a technical problem that needs to be urgently resolved.

SUMMARY

This application provides a traffic flow control method, a traffic flow control device, and an in-vehicle device in the internet of vehicles, to help a vehicle in the internet of vehicles travel safely and efficiently at an intersection.

According to a first aspect, this application provides a traffic flow control method in the internet of vehicles. The traffic flow control method includes:

receiving, by a traffic flow control device, traffic control request signaling sent by an in-vehicle device of a first vehicle, where the traffic control request signaling includes travel information of the first vehicle and a travel intention of the first vehicle;

determining, by the traffic flow control device, traffic command signaling based on the traffic control request signaling and traffic control phase information of a target intersection, where the target intersection is an intersection through which the first vehicle is to pass; and sending, by the traffic flow control device, the traffic command signaling to the in-vehicle device.

In the traffic flow control method, the traffic flow control device sends the traffic command signaling to the first vehicle based on the travel information of the first vehicle, the travel intention of the first vehicle, and the traffic phase control information of the target intersection, so that the first vehicle is enabled to travel at the target intersection as instructed by the traffic command signaling.

In one embodiment, the traffic flow control method further includes:

determining, by the traffic flow control device, an entrance lane and an exit lane of the first vehicle at the target intersection based on the travel information, the travel intention, and lane information of the target intersection, where the entrance lane is a lane that is allocated by the traffic flow control device to the first vehicle for entering the target intersection, and the exit lane is a lane that is allocated by the traffic flow control device to the first vehicle for exiting from the target intersection; or determining, by the traffic flow control device, an entrance lane and an exit lane of the first vehicle at the target intersection based on the travel information, the travel intention, lane information of the target intersection, and traffic flow information of the target intersection.

In one embodiment, the travel information includes a location of the first vehicle and a speed of the first vehicle; and the traffic flow control method further includes:

determining, by the traffic flow control device, a first time based on the speed of the first vehicle, the location of the first vehicle, and a current lane in which the first vehicle is located, where the first time is a time required for the first vehicle to travel off a stopline of the current lane from the location of the first vehicle along the current lane, and the current lane is obtained by the traffic flow control device through calculation based on the location of the first vehicle and the lane information of the target intersection, or the current lane is carried in the travel information.

In one embodiment, the travel information further includes an acceleration of the first vehicle; and the determining, by the traffic flow control device, a first time based on the speed of the first vehicle, the location of the first vehicle, and a current lane in which the first vehicle is located includes:

determining, by the traffic flow control device, the first time based on the speed of the first vehicle, the location of the first vehicle, the current lane, and the acceleration of the first vehicle.

In one embodiment, the travel information includes a location of the first vehicle; and the traffic flow control method further includes:

determining, by the traffic flow control device, a first time based on a preset vehicle speed at the target intersection, the location of the first vehicle, and a current lane in which the first vehicle is located, where the first time is a time required for the first vehicle to travel off a stopline of the current lane from the location of the first vehicle along the current lane, and the current lane is obtained by the traffic flow control device through calculation based on the location of the first vehicle and the lane information of the target intersection, or the current lane is carried in the travel information.

In one embodiment, the determining, by the traffic flow control device, traffic command signaling based on the traffic control request signaling and traffic control phase information of a target intersection includes:

when a traffic control phase corresponding to the traffic control phase information of the target intersection is a green-go phase, and a remaining time of the green-go phase is longer than or equal to the first time, determining, by the traffic flow control device, that the traffic command signaling is go command signaling, where the go command signaling includes the traffic control phase information of the target intersection and information about the exit lane.

In one embodiment, the determining, by the traffic flow control device, traffic command signaling based on the traffic control request signaling and traffic control phase information of a target intersection includes:

when a traffic control phase corresponding to the traffic control phase information of the target intersection is a green-go phase, and a remaining time of the green-go phase is shorter than the first time, determining, by the traffic flow control device, that the traffic command signaling is first stop command signaling, where the first stop command signaling includes the traffic control phase information of the target intersection and location information of the stopline of the current lane.

In one embodiment, the traffic flow control method further includes:

when the traffic control phase corresponding to the traffic control phase information of the target intersection switches again to the green-go phase, and the traffic flow control device learns through monitoring that the first vehicle has traveled to the stopline, sending, by the traffic flow control device, go command signaling to the in-vehicle device, where the go command signaling includes the traffic control phase information of the target intersection and information about the exit lane; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at a current speed and acceleration of the first vehicle along the current lane is shorter than or equal to a remaining time of the green-go phase to which the traffic control phase switches again, sending, by the traffic flow control device, go command signaling to the in-vehicle device, where the go command signaling includes the traffic control phase information of the target intersection and information about the exit lane; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at a current speed and acceleration of the first vehicle along the current lane is longer than a remaining time of the green-go phase to which the traffic control phase switches again, sending, by the traffic flow control device, second stop command signaling to the in-vehicle device, where the second stop command signaling includes the traffic control phase information of the target intersection and the location information of the stopline of the current lane.

In one embodiment, the determining, by the traffic flow control device, traffic command signaling based on the traffic control request signaling and traffic control phase information of a target intersection includes:

when a traffic control phase corresponding to current traffic control phase information of the target intersection is a red-stop phase, determining, by the traffic flow control device, that the traffic command signaling is first stop command signaling, where the first stop command signaling includes the traffic control phase information of the target intersection and location information of the stopline of the current lane, and the current lane is obtained by the traffic flow control device through calculation based on the location of the first vehicle and the lane information of the target intersection, or the current lane is carried in the travel information.

In one embodiment, the traffic flow control method further includes:

when the traffic control phase corresponding to the traffic control phase information of the target intersection switches to a green-go phase, and the traffic flow control device learns through monitoring that the first vehicle has traveled to the stopline, sending, by the traffic flow control device, go command signaling to the in-vehicle device, where the go command signaling includes the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at a current speed and acceleration of the first vehicle along the current lane is shorter than or equal to a remaining time of the green-go phase, sending, by the traffic flow control device, go command signaling to the in-vehicle device, where the go command signaling includes the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at a current speed and acceleration of the first vehicle along the current lane is longer than a remaining time of the green-go phase, sending, by the traffic flow control device, second stop command signaling to the in-vehicle device, where the second stop command signaling include the traffic control phase information of the target intersection and location information of the stopline of the current lane.

In one embodiment, the determining, by the traffic flow control device, traffic command signaling based on the traffic control request signaling and traffic control phase information of a target intersection includes:

when a traffic control phase corresponding to the traffic control phase information of the target intersection is a green-go phase, and a remaining time of the green-go phase is longer than or equal to the first time, determining, by the traffic flow control device, that the traffic command signaling is go command signaling, where the go command signaling includes the traffic control phase information of the target intersection, information about the exit lane, and the preset vehicle speed at the target intersection.

In one embodiment, the determining, by the traffic flow control device, traffic command signaling based on the traffic control request signaling and traffic control phase information of a target intersection includes:

when a traffic control phase corresponding to the traffic control phase information of the target intersection is a green-go phase, and a remaining time of the green-go phase is shorter than the first time, determining, by the traffic flow control device, that the traffic command signaling is first stop command signaling, where the first stop command signaling includes the traffic control phase information of the target intersection, location information of the stopline of the current lane, and the preset vehicle speed at the target intersection.

In one embodiment, the traffic flow control method further includes:

when the traffic control phase corresponding to the traffic control phase information of the target intersection switches again to the green-go phase, and the traffic flow control device learns through monitoring that the first vehicle has traveled to the stopline, sending, by the traffic flow control device, go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at the preset vehicle speed at the target intersection along the current lane is shorter than or equal to a remaining time of the green-go phase to which the traffic control phase switches again, sending, by the traffic flow control device, go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at the preset vehicle speed at the target intersection along the current lane is longer than a remaining time of the green-go phase to which the traffic control phase switches again, sending, by the traffic flow control device, second stop command signaling to the in-vehicle device, where the second stop command signaling includes the traffic control phase information of the target intersection, the location information of the stopline of the current lane, and the preset vehicle speed at the target intersection.

In one embodiment, the determining, by the traffic flow control device, traffic command signaling based on the traffic control request signaling and traffic control phase information of a target intersection includes:

when a traffic control phase corresponding to the traffic control phase information of the target intersection is a red-stop phase, determining, by the traffic flow control device, that the traffic command signaling is first stop command signaling, where the first stop command signaling includes the traffic control phase information of the target intersection, location information of the stopline of the current lane, and the preset vehicle speed at the target intersection.

In one embodiment, the traffic flow control method further includes:

when the traffic control phase corresponding to the traffic control phase information of the target intersection switches to a green-go phase, and the traffic flow control device learns through monitoring that the first vehicle has traveled to the stopline, sending, by the traffic flow control device, go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at the preset vehicle speed at the target intersection along the current lane is shorter than or equal to a time of the green-go phase, sending, by the traffic flow control device, go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at the preset vehicle speed at the target intersection along the current lane is longer than a time of the green-go phase, sending, by the traffic flow control device, second stop command signaling to the in-vehicle device, where the second stop command signaling includes the traffic control phase information of the target intersection, the location information of the stopline of the current lane, and the preset vehicle speed at the target intersection.

In one embodiment, the determining, by the traffic flow control device, traffic command signaling based on the traffic control request signaling and traffic control phase information of a target intersection includes:

after the first time, when a traffic control phase corresponding to the traffic control phase information of the target intersection is a green-go phase, determining, by the traffic flow control device, that the traffic command signaling is go command signaling, where the go command signaling includes traffic control phase information of the target intersection obtained after the first time and information about the exit lane; or after the first time, when a traffic control phase corresponding to the traffic control phase information of the target intersection is a red-stop phase, determining, by the traffic flow control device, that the traffic command signaling is stop command signaling, where the stop command signaling includes traffic control phase information of the target intersection obtained after the first time and location information of the stopline of the current lane.

In one embodiment, the determining, by the traffic flow control device, traffic command signaling based on the traffic control request signaling and traffic control phase information of a target intersection includes:

after the first time, when a traffic control phase corresponding to the traffic control phase information of the target intersection is a green-go phase, determining, by the traffic flow control device, that the traffic command signaling is go command signaling, where the go command signaling includes traffic control phase information of the target intersection obtained after the first time, the preset vehicle speed at the target intersection, and information about the exit lane; or after the first time, when a traffic control phase corresponding to the traffic control phase information of the target intersection is a red-stop phase, determining, by the traffic flow control device, that the traffic command signaling is stop command signaling, where the stop command signaling includes traffic control phase information of the target intersection obtained after the first time, the preset vehicle speed at the target intersection, and location information of the stopline of the current lane.

In one embodiment, the determining, by the traffic flow control device, traffic command signaling based on the traffic control request signaling and traffic control phase information of a target intersection includes:

when a distance between the first vehicle and a second vehicle that travels ahead of the first vehicle and that is located in the current lane is less than a preset distance threshold, sending, by the traffic flow control device, follow command signaling to the in-vehicle device, where the follow command signaling includes identification information of the second vehicle, and the current lane is obtained by the traffic flow control device through calculation based on a location of the first vehicle and the lane information of the target intersection, or the current lane is carried in the travel information.

In one embodiment, the traffic flow control method further includes:

when a traffic control phase corresponding to the traffic control phase information of the target intersection is a green-go phase, a time required for the second vehicle to travel off a stopline of the current lane from a current location of the second vehicle is shorter than or equal to a remaining time of the green-go phase, and a time required for the first vehicle to travel off the stopline of the current lane from a current location of the first vehicle is longer than the remaining time of the green-go phase, sending, by the traffic flow control device, stop command signaling to the in-vehicle device, where the stop command signaling includes the traffic control phase information of the target intersection and location information of the stopline of the current lane.

In one embodiment, the traffic flow control method further includes:

when the traffic control phase corresponding to the traffic control phase information of the target intersection switches again to the green-go phase, and the traffic flow control device learns through monitoring that the first vehicle has traveled to the stopline of the current lane, sending, by the traffic flow control device, go command signaling to the in-vehicle device, where the go command signaling includes the traffic control phase information of the target intersection and information about the exit lane.

In one embodiment, the determining, by the traffic flow control device, traffic command signaling based on the traffic control request signaling and traffic control phase information of a target intersection includes:

when a current lane in which the first vehicle is located is not the entrance lane, sending, by the traffic flow control device, lane change command signaling to the in-vehicle device, where the lane change command signaling includes information about the entrance lane, and the current lane is obtained by the traffic flow control device through calculation based on a location of the first vehicle and the lane information of the target intersection, or the current lane is carried in the travel information.

In one embodiment, the traffic flow control method further includes:

sending, by the traffic flow control device, stop command signaling or deceleration command signaling to a third vehicle that is in the entrance lane and that is at the rear of the first vehicle, where the stop command signaling includes information about a location at which the third vehicle is to stop, and the deceleration command signaling includes speed information of the third vehicle after deceleration.

In one embodiment, the determining, by the traffic flow control device, an entrance lane and an exit lane of the first vehicle at the target intersection based on the travel information, the travel intention, lane information of the target intersection, and traffic flow information of the target intersection includes:

determining, by the traffic flow control device, a plurality of entrance lanes based on the travel intention and the lane information of the target intersection;

determining, by the traffic flow control device, the entrance lane from the plurality of entrance lanes based on the traffic flow information of the target intersection and the current lane, where the current lane is obtained by the traffic flow control device through calculation based on the location of the first vehicle and the lane information of the target intersection, or the current lane is carried in the travel information;

determining, by the traffic flow control device, a plurality of exit lanes based on the travel intention and the lane information of the target intersection; and determining, by the traffic flow control device, the exit lane from the plurality of exit lanes based on the traffic flow information of the target intersection and the entrance lane.

In one embodiment, the traffic control phase information of the target intersection is traffic control phase information that is obtained by the traffic flow control device from a traffic signal light of the target intersection, or is traffic control phase information that is generated by the traffic flow control device.

According to a second aspect, this application provides a traffic flow control method in the internet of vehicles. The traffic flow control method includes: sending, by an in-vehicle device of a first vehicle, traffic control request signaling to a traffic flow control device, where the traffic control request signaling includes travel information of the first vehicle and a travel intention of the first vehicle, and the first vehicle is located in a management area of the traffic flow control device; and receiving, by the in-vehicle device, traffic command signaling sent by the traffic flow control device, so that the first vehicle travels according to the traffic command signaling, where the traffic command signaling is determined by the traffic flow control device based on the traffic control request signaling and traffic control phase information of a target intersection, and the target intersection is an intersection through which the first vehicle is to pass.

In the traffic flow control method, after sending the travel information to the traffic flow control device, the first vehicle receives the traffic command signaling that is sent by the traffic flow control device based on the travel information of the first vehicle, the travel intention of the first vehicle, and the traffic control phase information, and travels according to the traffic control signaling.

In one embodiment, the traffic command signaling includes at least one of go command signaling, stop command signaling, follow command signaling, and lane change command signaling, where the go command signaling includes the traffic control phase information of the target intersection and information about an exit lane of the first vehicle at the target intersection, or the go command signaling includes the traffic control phase information of the target intersection, a preset vehicle speed at the target intersection, and information about an exit lane of the first vehicle at the target intersection; the stop command signaling includes traffic control phase information and location information of a stopline of a current lane in which the first vehicle is located; the follow command signaling includes identification information of a second vehicle, where the second vehicle is a vehicle that travels ahead of the first vehicle and that is located in the current lane, and a distance between the second vehicle and the first vehicle is less than a preset distance threshold; and the lane change command signaling includes information about an entrance lane of the first vehicle at the target intersection.

According to a third aspect, this application provides a traffic flow control method in the internet of vehicles. The traffic flow control method includes: receiving, by a traffic flow control device, traffic control request signaling sent by a first vehicle, where the traffic control request signaling includes current travel information of the first vehicle and a travel intention of the first vehicle; determining, by the traffic flow control device, follow command signaling based on the traffic control request signaling, where the follow command signaling includes identification information of a second vehicle that travels ahead of the first vehicle; and sending, by the traffic flow control device, the follow command signaling to the first vehicle.

In the traffic flow control method, the traffic flow control device sends the follow command signaling to the first vehicle based on the travel information and/or the travel intention of the first vehicle, to instruct the first vehicle to follow the second vehicle in traveling, thereby reducing traffic command signaling.

The travel intention of the first vehicle may be a destination of the first vehicle, or may be a road segment through which the first vehicle is likely to pass during traveling.

In one embodiment, the travel information includes a location of the first vehicle and a current lane in which the first vehicle is located. The determining, by the traffic flow control device, follow command signaling based on the traffic control request signaling includes: determining, by the traffic flow control device, the follow command signaling when the traffic flow control device determines, based on the travel information, that the first vehicle and the second vehicle are in the same lane, and a distance between the second vehicle and the first vehicle is less than a preset distance threshold, and the traffic flow control device determines, based on the travel intention, that the travel intention of the first vehicle is the same as a travel intention of the second vehicle.

The travel intention of the second vehicle may be a destination of the second vehicle, or may be a road segment through which the second vehicle is likely to pass during traveling.

According to a fourth aspect, this application provides a traffic flow control method in the internet of vehicles. The traffic flow control method includes: sending, by an in-vehicle device, traffic control request signaling to a traffic flow control device, where the traffic control request signaling includes travel information of a first vehicle to which the in-vehicle device belongs and a travel intention of the first vehicle; and receiving, by the in-vehicle device, follow command signaling sent by the traffic flow control device, so that the first vehicle travels according to the traffic command signaling, where the follow command signaling includes identification information of a second vehicle that travels ahead of the first vehicle, and the follow command signaling is determined by the traffic flow control device based on the traffic control request signaling.

In the traffic flow control method, the first vehicle sends the travel information and the travel intention of the first vehicle to the traffic flow control device, so that the traffic flow control device sends the traffic command signaling to the first vehicle based on the travel information and the travel intention of the first vehicle, to instruct the first vehicle to follow the second vehicle in traveling, thereby reducing traffic command signaling.

The travel intention of the first vehicle may be a destination of the first vehicle, or may be a road segment through which the first vehicle is likely to pass during traveling.

In one embodiment, the travel information includes a location of the first vehicle and a current lane in which the first vehicle is located.

According to a fifth aspect, this application provides a traffic flow control device. The traffic flow control device includes a module configured to perform the traffic flow control method in any one of the first aspect or the possible implementations of the first aspect. The module included in the traffic flow control device may be implemented by software and/or hardware.

According to a sixth aspect, this application provides an in-vehicle device. The in-vehicle device includes a module configured to perform the traffic flow control method in any one of the second aspect or the possible implementations of the second aspect. The module included in the in-vehicle device may be implemented by software and/or hardware.

According to a seventh aspect, this application provides a traffic flow control device. The traffic flow control device includes a module configured to perform the traffic flow control method in any one of the third aspect or the possible implementations of the third aspect. The module included in the traffic flow control device may be implemented by software and/or hardware.

According to an eighth aspect, this application provides an in-vehicle device. The in-vehicle device includes a module configured to perform the traffic flow control method in any one of the fourth aspect or the possible implementations of the fourth aspect. The module included in the in-vehicle device may be implemented by software and/or hardware.

According to a ninth aspect, this application provides a traffic flow control device. The traffic flow control device includes a processor, a receiver, and a transmitter. The processor is configured to execute a program. When the processor executes code, the receiver and the transmitter are configured to implement the traffic flow control method in any one of the first aspect or the possible implementations of the first aspect.

In one embodiment, the traffic flow control device may further include a memory, where the memory is configured to store the code executed by the processor.

According to a tenth aspect, this application provides an in-vehicle device. The in-vehicle device includes a processor, a receiver, and a transmitter. The processor is configured to execute a program. When the processor executes code, the receiver and the transmitter are configured to implement the traffic flow control method in any one of the second aspect or the possible implementations of the second aspect.

In one embodiment, the in-vehicle device may further include a memory, where the memory is configured to store the code executed by the processor.

According to an eleventh aspect, this application provides a traffic flow control device. The traffic flow control device includes a processor, a receiver, and a transmitter. The processor is configured to execute a program. When the processor executes code, the receiver and the transmitter are configured to implement the traffic flow control method in any one of the third aspect or the possible implementations of the third aspect.

In one embodiment, the traffic flow control device may further include a memory, where the memory is configured to store the code executed by the processor.

According to a twelfth aspect, this application provides an in-vehicle device. The in-vehicle device includes a processor, a receiver, and a transmitter. The processor is configured to execute a program. When the processor executes code, the receiver and the transmitter are configured to implement the traffic flow control method in any one of the fourth aspect or the possible implementations of the fourth aspect.

In one embodiment, the in-vehicle device may further include a memory, where the memory is configured to store the code executed by the processor.

According to a thirteenth aspect, this application provides a computer-readable storage medium. The computer-readable storage medium stores program code to be executed by a traffic flow control device. The program code includes an instruction used for performing the traffic flow control method in any one of the first aspect or the possible implementations of the first aspect.

According to a fourteenth aspect, this application provides a computer-readable storage medium. The computer-readable storage medium stores program code to be executed by an in-vehicle device. The program code includes an instruction used for performing the traffic flow control method in any one of the second aspect or the possible implementations of the second aspect.

According to a fifteenth aspect, this application provides a computer-readable storage medium. The computer-readable storage medium stores program code to be executed by a traffic flow control device. The program code includes an instruction used for performing the traffic flow control method in any one of the third aspect or the possible implementations of the third aspect.

According to a sixteenth aspect, this application provides a computer-readable storage medium. The computer-readable storage medium stores program code to be executed by an in-vehicle device. The program code includes an instruction used for performing the traffic flow control method in any one of the fourth aspect or the possible implementations of the fourth aspect.

According to a seventeenth aspect, this application provides a computer program product including an instruction. When the computer program product is run on a traffic flow control device, the traffic flow control device is enabled to perform the traffic flow control method in any one of the first aspect or the possible implementations of the first aspect.

According to an eighteenth aspect, this application provides a computer program product including an instruction. When the computer program product is run on an in-vehicle device, the in-vehicle device is enabled to perform the traffic flow control method in any one of the second aspect or the possible implementations of the second aspect.

According to a nineteenth aspect, this application provides a computer program product including an instruction. When the computer program product is run on a traffic flow control device, the traffic flow control device is enabled to perform the traffic flow control method in any one of the third aspect or the possible implementations of the third aspect.

According to a twentieth aspect, this application provides a computer program product including an instruction. When the computer program product is run on an in-vehicle device, the in-vehicle device is enabled to perform the traffic flow control method in any one of the fourth aspect or the possible implementations of the fourth aspect.

According to a twenty-first aspect, a system chip is provided. The system chip includes an input/output interface, at least one processor, at least one memory, and a bus. The at least one memory is configured to store an instruction, and the at least one processor is configured to invoke the instruction stored in the at least one memory, to perform operations in the traffic flow control methods in the foregoing aspects.

According to a twenty-second aspect, this application provides a vehicle. The vehicle includes the in-vehicle device in the sixth aspect, the eighth aspect, the tenth aspect, or the twelfth aspect.

DESCRIPTION OF EMBODIMENTS

The following describes technical solutions of this application with reference to accompanying drawings.

Figure 1:
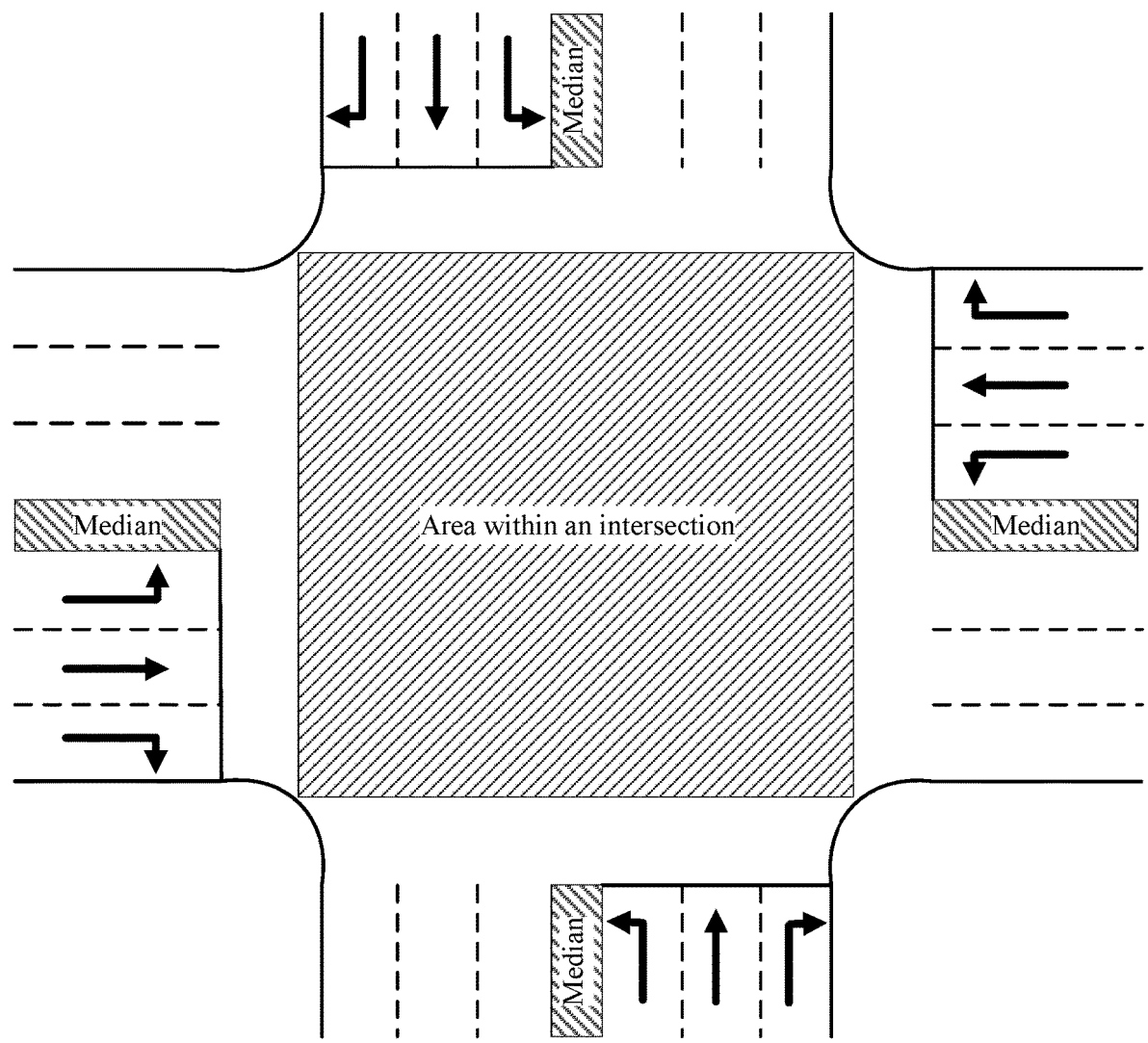
FIG. 1 is a schematic diagram of an application scenario of a traffic flow control method according to an embodiment of this application.

An intersection in an application scenario shown in FIG. 1 includes roads in four directions. One road includes lanes in two directions, where a lane in one direction is an entrance lane, and a lane in the other direction is an exit lane. It should be noted that the entrance lane described herein is a lane for entering an area within an intersection, and an exit lane described herein is a lane for exiting from the area within the intersection. There is a stopline before the entrance lane.

One road includes three entrance lanes, where one entrance lane is a right-turn lane, one entrance lane is a straight lane, and one lane is a left-turn lane.

It should be understood that the application scenario shown in FIG. 1 is only an example, and a traffic flow control method, a traffic flow control device, and an in-vehicle device in the embodiments of this application are not limited to the application scenario.

For example, in an application scenario of the traffic flow control method, the traffic flow control device, and the in-vehicle device in the embodiments of this application, roads in more or less directions may be included, and/or a road in each direction may include more or less lanes, a common lane for turning left and going straight, and/or the like.

Figure 2:
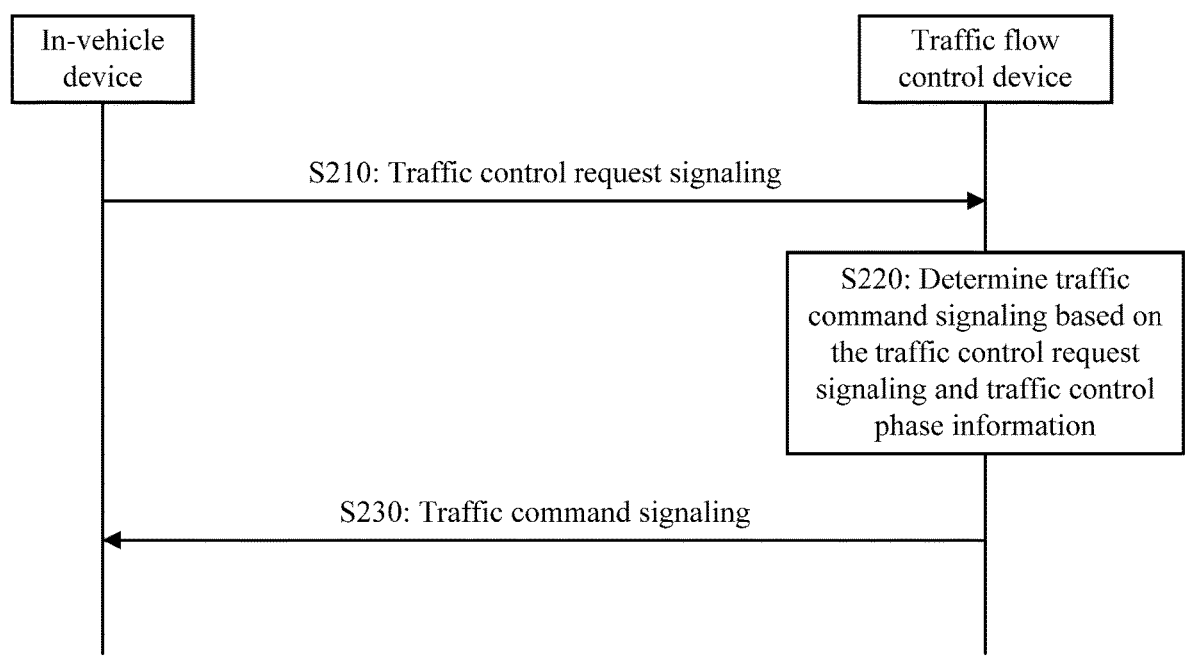
FIG. 2 is a schematic flowchart of a traffic flow control method according to an embodiment of this application.

FIG. 2 is a schematic flowchart of a traffic flow control method according to an embodiment of this application. It should be understood that FIG. 2 shows steps or operations of the traffic flow control method, but these steps or operations are only an example. In this embodiment of this application, other operations or variations of the operations in FIG. 2 may also be performed. In addition, the steps in FIG. 2 may be performed in a sequence different from that presented in FIG. 2, and possibly not all operations in FIG. 2 need to be performed.

The traffic flow control method shown in FIG. 2 may include S210, S220, and S230.

S210: An in-vehicle device of a first vehicle sends traffic control request signaling to a traffic flow control device, where the traffic control request signaling includes travel information of the first vehicle and a travel intention of the first vehicle. The first vehicle is located within a service area of the traffic flow control device.

Correspondingly, the traffic flow control device receives the traffic control request signaling sent by the in-vehicle device of the first vehicle.

For example, the traffic flow control device may be deployed near a target intersection of the first vehicle, and when the first vehicle travels into the service area of the traffic flow control device, the in-vehicle device on the first vehicle sends the traffic control request signaling to the traffic flow control device. The target intersection is an intersection through which the first vehicle is to pass.

The travel information of the first vehicle may include at least one of the following information: a location of the first vehicle, a speed of the first vehicle, an acceleration of the first vehicle, or a current lane in which the first vehicle is located.

The travel intention of the first vehicle may include one or more of turning left, going straight, turning right, turning around, an exit lane of the first vehicle, and a target road of the first vehicle.

S220: The traffic flow control device determines traffic command signaling based on the traffic control request signaling and traffic control phase information of a target intersection.

The traffic control phase information of the target intersection may include a phase of a traffic signal light at the target intersection and a remaining time of the phase, or may include a traffic signal phase that is simulated by the traffic flow control device and a remaining time of the traffic signal phase.

For example, the phase of the traffic signal light may be a red-light phase, a green-light phase, or a yellow-light phase, and the remaining time of the phase of the traffic signal light may be, for example, 30 seconds.

The traffic command signaling may include go command signaling used to command the first vehicle to go; stop command signaling used to command the first vehicle to stop; follow command signaling used to command the first vehicle to follow another vehicle in traveling; lane change command signaling used to command the first vehicle to change lane; deceleration command signaling used to command the first vehicle to slow down; and the like.

The go command signaling may include at least one of current traffic control phase information of the target intersection, information about an entrance lane of the first vehicle at the target intersection, a preset vehicle speed at the target intersection, and information about an exit lane of the first vehicle at the target intersection. The stop command signaling may include at least one of current traffic control phase information of the target intersection, a preset vehicle speed at the target intersection, and location information of a stopline of an entrance lane of the first vehicle at the target intersection. The follow command signaling may include identification information of a second vehicle. The lane change command signaling may include lane information after lane change. The deceleration command signaling may include speed information after deceleration.

The second vehicle is a vehicle that is located in a same lane as the first vehicle and that has a distance from the first vehicle, where the distance is less than a preset distance threshold. The entrance lane of the first vehicle is a lane that is allocated by the traffic flow control device to the first vehicle for entering the target intersection, and the exit lane is a lane that is allocated by the traffic flow control device to the first vehicle for exiting from the target intersection.

In one embodiment, the entrance lane and the exit lane of the first vehicle may be determined by the traffic flow control device based on the travel information of the first vehicle, the travel intention of the first vehicle, and lane information of the target intersection. Alternatively, the entrance lane and the exit lane of the first vehicle may be determined by the traffic flow control device based on the travel information of the first vehicle, the travel intention of the first vehicle, lane information of the target intersection, and traffic flow information of the target intersection.

The lane information of the target intersection may include: A vehicle to turn left travels in a left-most lane, a vehicle to go straight travels in the left-most lane or a middle lane, and a vehicle to turn right travels in a right-most lane.

The traffic flow information of the target intersection may be understood as a set of vehicles in lanes at the target intersection. For example, the traffic flow information of the target intersection may include a traffic flow length in the entrance lane, information about waiting duration at an entrance, location information of the first vehicle in a traffic flow, and/or information about congestion and queuing in the exit lane.

In one embodiment, that the traffic flow control device determines the entrance lane and the exit lane of the first vehicle at the target intersection based on the travel information of the first vehicle, the travel intention of the first vehicle, lane information of the target intersection, and traffic flow information of the target intersection may be implemented in the following manner.

The traffic flow control device determines a plurality of entrance lanes based on the travel intention of the first vehicle and the lane information of the target intersection, and the traffic flow control device determines the entrance lane from the plurality of entrance lanes based on the traffic flow information of the target intersection and the lane in which the first vehicle is located. The traffic flow control device determines a plurality of exit lanes based on the travel intention and the lane information of the target intersection, and the traffic flow control device determines the exit lane from the plurality of exit lanes based on the traffic flow information of the target intersection and the entrance lane.

For example, the travel intention of the first vehicle is turning left, and a road in which the first vehicle is currently located includes two left-turn lanes. When a traffic flow in a first left-turn lane is longer than that in a second left-turn lane, and waiting duration is longer, the traffic flow control device may determine the second left-turn lane as the entrance lane of the first vehicle.

S230: The traffic flow control device sends the traffic command signaling to the in-vehicle device.

Correspondingly, the in-vehicle device receives the traffic command signaling, so that the first vehicle travels according to the traffic command signaling.

In the traffic flow control method in this embodiment of this application, the traffic flow control device sends the traffic command signaling to the first vehicle based on the travel information of the first vehicle, the travel intention of the first vehicle, and the traffic phase control information of the target intersection, so that the first vehicle is enabled to travel at the target intersection as instructed by the traffic command signaling.

An example in which the first vehicle travels according to the traffic command signaling may include: A control unit on the first vehicle controls traveling of the first vehicle based on the traffic command signaling and sensed data of the first vehicle.

The sensed data of the first vehicle may include at least one of the following: information data of a nearby vehicle, a pedestrian, or an obstacle that is sensed by the first vehicle by using an in-vehicle sensor such as a camera, a laser radar, or a millimeter wave radar, and information data of a nearby vehicle, a pedestrian, or an obstacle that is received by the first vehicle through the in-vehicle device.

An example in which the control unit on the first vehicle controls traveling of the first vehicle based on the traffic command signaling and the sensed data of the first vehicle may include: When the traffic command signaling is go command signaling, but a vehicle ahead of the first vehicle stops, the control unit may control the first vehicle to stop.

In other words, for the first vehicle, the traffic command signaling may be control signaling, that is, for directly controlling the first vehicle to travel according to the traffic command signaling. Alternatively, the traffic command signaling may be only signaling for reference. To be specific, the first vehicle may use the traffic command signaling as a reference and control traveling of the first vehicle with reference to information about the first vehicle and/or another vehicle and/or a road, instead of traveling completely according to the traffic command signaling.

Alternatively, the in-vehicle device on the first vehicle may notify a driver of the first vehicle of the traffic command signaling, so that the driver drives the first vehicle according to the traffic command signaling.

For example, the in-vehicle device may provide a notification to a human-machine interface (HMI) system on the first vehicle, so that the HMI system notifies the driver of the traffic command signaling through a voice, a text, an icon, an image, or another manner.

In one embodiment, the travel information of the first vehicle may include a location of the first vehicle. In this case, before the traffic flow control device determines traffic command signaling based on the traffic control request signaling and traffic control phase information of the target intersection, the traffic flow control method may further include: The traffic flow control device determines a first time based on a preset vehicle speed at the target intersection, the location of the first vehicle, and a lane in which the first vehicle is located, where the first time is a time required for the first vehicle to travel off a stopline of the lane in which the first vehicle is located from the location of the first vehicle along the lane in which the first vehicle is located, and the lane in which the first vehicle is located may be obtained by the traffic flow control device through calculation based on the location of the first vehicle, or the lane in which the first vehicle is located may be carried in the travel information.

In one embodiment, the travel information of the first vehicle may further include a speed of the first vehicle in addition to a location of the first vehicle. In this case, an implementation of determining the first time in the traffic flow control method may include: The traffic flow control device determines a first time based on the speed of the first vehicle, the location of the first vehicle, and a lane in which the first vehicle is located, where the first time is a time required for the first vehicle to travel off a stopline of the lane in which the first vehicle is located from the location of the first vehicle along the lane in which the first vehicle is located, and the lane in which the first vehicle is located is obtained by the traffic flow control device through calculation based on the location of the first vehicle, or the lane in which the first vehicle is located is carried in the travel information.

In one embodiment, the travel information of the first vehicle may further include an acceleration of the first vehicle in addition to a location of the first vehicle and a speed of the first vehicle. In this case, that the traffic flow control device determines the first time based on the speed of the first vehicle, the location of the first vehicle, and a lane in which the first vehicle is located may include: The traffic flow control device determines the first time based on the speed of the first vehicle, the location of the first vehicle, the lane in which the first vehicle is located, and the acceleration of the first vehicle.

After the traffic flow control device determines the first time, S220, that is, the traffic flow control device determines traffic command signaling based on the traffic control request signaling and traffic control phase information of a target intersection, may be implemented in the following possible manners.

In one embodiment, that the traffic flow control device determines traffic command signaling based on the traffic control request signaling and traffic control phase information of a target intersection may include: when a traffic control phase corresponding to the traffic control phase information of the target intersection is a green-go phase, and a remaining time of the green-go phase is longer than or equal to the first time, the traffic flow control device determines that the traffic command signaling is go command signaling.

If the first time is determined based on the location of the first vehicle and the speed of the first vehicle, the go command signaling may include the traffic control phase information of the target intersection and information about the exit lane.

If the first time is obtained based on the preset vehicle speed at the target intersection, the go command signaling may include the traffic control phase information of the target intersection, information about the exit lane, and the preset vehicle speed at the target intersection.

The traffic control phase information included in the go command signaling may be the green-go phase and the remaining time of the green-go phase.

In a second possible implementation, that the traffic flow control device determines traffic command signaling based on the traffic control request signaling and traffic control phase information of a target intersection may include: when a traffic control phase corresponding to the traffic control phase information of the target intersection is a green-go phase, and a remaining time of the green-go phase is shorter than the first time, the traffic flow control device determines that the traffic command signaling is stop command signaling.

For ease of description, the stop command signaling may be referred to as first stop command signaling.

If the first time is determined based on the location of the first vehicle and the speed of the first vehicle, the first stop command signaling may include current traffic control phase information of the target intersection and location information of the stopline of the lane in which the first vehicle is located.

If the first time is obtained based on the preset vehicle speed at the target intersection, the first stop command signaling may include current traffic control phase information of the target intersection, location information of the stopline of the lane in which the first vehicle is located, and the preset vehicle speed at the target intersection.

The traffic control phase information included in the first stop command signaling may be the green-go phase and the remaining time of the green-go phase.

If the traffic flow control device implements S220 based on the second possible implementation, the traffic flow control method may further include: When the traffic control phase corresponding to the traffic control phase information of the target intersection switches again to the green-go phase, and the traffic flow control device learns through monitoring that the first vehicle has traveled to the stopline of the lane in which the first vehicle is located, the traffic flow control device sends go command signaling to the in-vehicle device of the first vehicle.

If the first time is determined based on the location of the first vehicle and the speed of the first vehicle, the go command signaling may include current traffic control phase information of the target intersection and information about the exit lane used by the first vehicle to travel off the target intersection.

If the first time is obtained based on the preset vehicle speed at the target intersection, the go command signaling may include current traffic control phase information of the target intersection, information about the exit lane used by the first vehicle to travel off the target intersection, and the preset vehicle speed at the target intersection.

The traffic control phase information included in the go command signaling may be specifically the green-go phase to which the traffic control phase switches and a remaining time of the green-go phase.

When the traffic flow control device implements S220 based on the second possible implementation, the traffic flow control method may optionally include: When the traffic control phase corresponding to the traffic control phase information of the target intersection switches again to the green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is shorter than or equal to a remaining time of the green-go phase to which the traffic control phase switches, the traffic flow control device sends go command signaling to the in-vehicle device of the first vehicle.

If the first time is determined based on the location of the first vehicle and the speed of the first vehicle, the go command signaling may include current traffic control phase information of the target intersection and information about the exit lane used by the first vehicle to travel off the target intersection.

If the first time is obtained based on the preset vehicle speed at the target intersection, the go command signaling may include current traffic control phase information of the target intersection, information about the exit lane used by the first vehicle to travel off the target intersection, and the preset vehicle speed at the target intersection.

The traffic control phase information included in the go command signaling may be specifically the green-go phase to which the traffic control phase switches and a remaining time of the green-go phase.

When the traffic flow control device implements S220 based on the second possible implementation, the traffic flow control method may optionally include: When the traffic control phase corresponding to the traffic control phase information of the target intersection switches again to the green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is longer than a remaining time of the green-go phase to which the traffic control phase switches, the traffic flow control device sends stop command signaling to the in-vehicle device of the first vehicle.

For ease of description, the stop command signaling may be referred to as second stop command signaling.

If the first time is determined based on the location of the first vehicle and the speed of the first vehicle, the stop command signaling may include current traffic control phase information of the target intersection and location information of the stopline of the lane in which the first vehicle is located.

If the first time is obtained based on the preset vehicle speed at the target intersection, the second stop command signaling may include current traffic control phase information of the target intersection, location information of the stopline of the lane in which the first vehicle is located, and the preset vehicle speed at the target intersection.

The traffic control phase information included in the second stop command signaling may be the green-go phase to which the traffic control phase switches and the remaining time of the green-go phase.

In one embodiment, that the traffic flow control device determines traffic command signaling based on the traffic control request signaling and traffic control phase information of a target intersection may include: when a traffic control phase corresponding to current traffic control phase information of the target intersection is a red-stop phase, the traffic flow control device determines that the traffic command signaling is stop command signaling.

For ease of description, the stop command signaling may be referred to as first stop command signaling.

If the first time is determined based on the location of the first vehicle and the speed of the first vehicle, the first stop command signaling may include the traffic control phase information of the target intersection and location information of the stopline of the lane in which the first vehicle is located.

If the first time is obtained based on the preset vehicle speed at the target intersection, the first stop command signaling may include the traffic control phase information of the target intersection, location information of the stopline of the lane in which the first vehicle is located, and the preset vehicle speed at the target intersection.

The traffic control phase information included in the first stop command signaling may be the red-stop phase and a remaining time of the red-stop phase.

If the traffic flow control device implements S220 in the third possible implementation, the traffic flow control method may further include: When the traffic control phase corresponding to the traffic control phase information of the target intersection switches to a green-go phase, and the traffic flow control device learns through monitoring that the first vehicle has traveled to the stopline, the traffic flow control device sends go command signaling to the in-vehicle device of the first vehicle.

If the first time is determined based on the location of the first vehicle and the speed of the first vehicle, the go command signaling may include the traffic control phase information of the target intersection and information about the exit lane used by the first vehicle to travel off the target intersection.

If the first time is obtained based on the preset vehicle speed at the target intersection, the go command signaling may include the traffic control phase information of the target intersection, information about the exit lane used by the first vehicle to travel off the target intersection, and the preset vehicle speed at the target intersection.

The traffic control phase information included in the go command signaling may be specifically the green-go phase to which the traffic control phase switches and a remaining time of the green-go phase.

Alternatively, the traffic flow control method may further include: When the traffic control phase corresponding to the traffic control phase information of the target intersection switches to a green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is shorter than or equal to a remaining time of the green-go phase to which the traffic control phase switches, the traffic flow control device sends go command signaling to the in-vehicle device of the first vehicle.

If the first time is determined based on the location of the first vehicle and the speed of the first vehicle, the go command signaling may include current traffic control phase information of the target intersection and information about the exit lane used by the first vehicle to travel off the target intersection.

If the first time is obtained based on the preset vehicle speed at the target intersection, the go command signaling may include current traffic control phase information of the target intersection, information about the exit lane used by the first vehicle to travel off the target intersection, and the preset vehicle speed at the target intersection.

The traffic control phase information included in the go command signaling may be specifically the green-go phase to which the traffic control phase switches and a remaining time of the green-go phase.

Alternatively, the traffic flow control method may further include: When the traffic control phase corresponding to the traffic control phase information of the target intersection switches to a green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is longer than a remaining time of the green-go phase to which the traffic control phase switches, the traffic flow control device sends stop command signaling to the in-vehicle device of the first vehicle.

For ease of description, the stop command signaling may be referred to as second stop command signaling.

If the first time is determined based on the location of the first vehicle and the speed of the first vehicle, the second stop command signaling may include the traffic control phase information of the target intersection and location information of the stopline of the lane in which the first vehicle is located.

If the first time is obtained based on the preset vehicle speed at the target intersection, the second stop command signaling may include the traffic control phase information of the target intersection, location information of the stopline of the lane in which the first vehicle is located, and the preset vehicle speed at the target intersection.

The traffic control phase information included in the second stop command signaling may be the green-go phase to which the traffic control phase switches and the remaining time of the green-go phase.

In one embodiment, that the traffic flow control device determines traffic command signaling based on the traffic control request signaling and traffic control phase information of a target intersection may include: after the first time, when a traffic control phase corresponding to the traffic control phase information of the target intersection is a green-go phase, the traffic flow control device determines that the traffic command signaling is go command signaling.

If the first time is determined based on the location of the first vehicle and the speed of the first vehicle, the go command signaling may include traffic control phase information of the target intersection obtained after the first time and information about the exit lane used by the first vehicle to travel off the target intersection.

If the first time is obtained based on the preset vehicle speed at the target intersection, the go command signaling may include the preset vehicle speed at the target intersection, traffic control phase information of the target intersection obtained after the first time, and information about the exit lane used by the first vehicle to travel off the target intersection.

The traffic control phase information included in the go command signaling may be specifically the green-go phase after the first time and a remaining time of the green-go phase. It should be understood that the green-go phase after the first time should be a green-go phase to which the traffic control phase switches for the first time after the first time.

Alternatively, that the traffic flow control device determines traffic command signaling based on the traffic control request signaling and traffic control phase information of a target intersection may include: After the first time, when a traffic control phase corresponding to the traffic control phase information of the target intersection is a red-stop phase, the traffic flow control device determines that the traffic command signaling is stop command signaling.

If the first time is determined based on the location of the first vehicle and the speed of the first vehicle, the stop command signaling may include traffic control phase information of the target intersection obtained after the first time and location information of the stopline of the lane in which the first vehicle is located.

If the first time is obtained based on the preset vehicle speed at the target intersection, the stop command signaling may include the preset vehicle speed at the target intersection, traffic control phase information of the target intersection obtained after the first time, and location information of the stopline of the lane in which the first vehicle is located.

The traffic control phase information included in the stop command signaling may be specifically the red-stop phase after the first time and a remaining time of the red-stop phase. It should be understood that the red-stop phase after the first time should be a red-stop phase to which the traffic control phase switches for the first time after the first time.

In one embodiment, that the traffic flow control device determines traffic command signaling based on the traffic control request signaling and traffic control phase information of a target intersection may include: when a distance between the first vehicle and a second vehicle that travels ahead of the first vehicle and that is located in the lane in which the first vehicle is located is less than a preset distance threshold, the traffic flow control device sends follow command signaling to the in-vehicle device of the first vehicle, where the follow command signaling includes identification information of the second vehicle, and the lane in which the first vehicle is located is obtained by the traffic flow control device through calculation based on a location of the first vehicle and the lane information of the target intersection, or the lane in which the first vehicle is located is carried in the travel information.

In one embodiment, the follow command signaling may further include information about the second vehicle such as a location, a speed, a physical size, a weight, a recommended distance, and a travel intention of the second vehicle.

After the first vehicle follows the second vehicle in traveling according to the follow command signaling, if a traffic control phase corresponding to the traffic control phase information of the target intersection is a green-go phase, a time required for the second vehicle to travel off a stopline of the lane in which the first vehicle is located from a current location of the second vehicle is shorter than or equal to a remaining time of the green-go phase, and a time required for the first vehicle to travel off the stopline of the lane in which the first vehicle is located from a current location of the first vehicle is shorter than or equal to the remaining time of the green-go phase, the first vehicle follows the second vehicle and travels off the stopline of the lane in which the first vehicle is located.

After the first vehicle follows the second vehicle in traveling according to the follow command signaling, if a traffic control phase corresponding to the traffic control phase information of the target intersection is a red-stop phase, the first vehicle follows the second vehicle and stops before the stopline of the lane in which the first vehicle is located.

After the first vehicle follows the second vehicle in traveling according to the follow command signaling, if a traffic control phase corresponding to the traffic control phase information of the target intersection is a green-go phase, a time required for the second vehicle to travel off a stopline of the lane in which the first vehicle is located from a current location of the second vehicle is shorter than or equal to a remaining time of the green-go phase, and a time required for the first vehicle to travel off the stopline of the lane in which the first vehicle is located from a current location of the first vehicle is longer than the remaining time of the green-go phase, the traffic flow control device sends stop command signaling to the in-vehicle device of the first vehicle.

The stop command signaling may include the traffic control phase information of the target intersection and location information of the stopline of the lane in which the first vehicle is located. Alternatively, the stop command signaling may include the traffic control phase information of the target intersection, location information of the stopline of the lane in which the first vehicle is located, and the preset vehicle speed at the target intersection.

The traffic control phase information included in the stop command signaling may be specifically the green-go phase and the remaining time of the green-go phase.

When the traffic control phase corresponding to the traffic control phase information of the target intersection switches again to the green-go phase, and the traffic flow control device learns through monitoring that the first vehicle has traveled to the stopline of the lane in which the first vehicle is located, the traffic flow control device may send go command signaling to the in-vehicle device of the first vehicle.

The go command signaling may include the traffic control phase information of the target intersection and information about the exit lane used by the first vehicle to travel off the target intersection, or may include the traffic control phase information of the target intersection, information about the exit lane used by the first vehicle to travel off the target intersection, and the preset vehicle speed at the target intersection.

The traffic control phase information included in the go command signaling may be specifically the green-go phase and the remaining time of the green-go phase.

In the foregoing implementations, optionally, the lane in which the first vehicle is located may be the entrance lane used by the first vehicle to enter the target intersection.

When the lane in which the first vehicle is located is not the entrance lane used by the first vehicle to enter the target intersection, a possible implementation in which the traffic flow control device determines traffic command signaling based on the traffic control request signaling and traffic control phase information of a target intersection may include: The traffic flow control device sends lane change command signaling to the in-vehicle device of the first vehicle, where the lane change command signaling includes information about the entrance lane that is allocated by the traffic flow control device to the first vehicle for entering the target intersection, and the lane in which the first vehicle is located may be obtained by the traffic flow control device through calculation based on a location of the first vehicle and the lane information of the target intersection, or the lane in which the first vehicle is located is carried in the travel information.

When the traffic flow control device sends the lane change command signaling to the first vehicle, if the traffic flow control device learns through monitoring that the first vehicle does not change lane, the traffic flow control device may send stop command signaling or deceleration command signaling to a third vehicle that is in the entrance lane and that is at the rear of the first vehicle, so that the first vehicle changes lane, where the stop command signaling includes information about a location at which the third vehicle is to stop, and the deceleration command signaling includes speed information of the third vehicle after deceleration.

A distance between the third vehicle and the first vehicle may be less than or equal to a preset distance threshold.

After the first vehicle changes from a lane to the entrance lane, the traffic flow control device may determine traffic command signaling according to one or more of the first to the fourth possible implementations that are described above, and send the traffic command signaling to the in-vehicle device of the first vehicle. In this case, the lane in which the first vehicle is located that is mentioned in the first to the fourth possible implementations is the entrance lane.

It should be understood that in the foregoing possible implementations, the traffic flow control device may first determine a length relationship between the first time and the remaining time of the traffic control phase corresponding to the traffic control phase information, and then determine traffic command signaling based on a type of the traffic control phase corresponding to the traffic control phase information. Alternatively, the traffic flow control device may first determine a type of the traffic control phase corresponding to the traffic control phase information, and then determine traffic command signaling based on a length relationship between the first time and the remaining time of the traffic control phase corresponding to the traffic control phase information.

For example, the traffic flow control device may first compare the first time with the remaining time of the traffic control phase. When the traffic flow control device determines that the remaining time of the traffic control phase is longer than the first time, the traffic flow control device determines, based on that the traffic control phase is a green-go phase, that the traffic command signaling is go command signaling, or determines, based on that the traffic control phase is a red-stop phase, that the traffic command signaling is stop command signaling.

For example, the traffic flow control device may first determine a type of the traffic control phase, and when the traffic control phase is the green-go phase, determine, based on that the remaining time of the green-go phase is longer than the first time, that the traffic command signaling is go command signaling.

Optionally, various traffic command signaling in this embodiment of this application may further include a highest vehicle speed at the target intersection, so that the first vehicle travels safely at a speed that is lower than or equal to the highest vehicle speed.

The following further describes interaction procedures in traffic flow control methods in this application with reference to FIG. 3 to FIG. 6A and FIG. 6B. It should be understood that FIG. 3 to FIG. 6A and FIG. 6B show steps or operations of the traffic flow control method, but these steps or operations are only an example. In this embodiment of this application, other operations or variations of the operations in FIG. 3 to FIG. 6A and FIG. 6B may also be performed. In addition, the steps in FIG. 3 to FIG. 6A and FIG. 6B may be performed in a sequence different from that presented in FIG. 3 to FIG. 6A and FIG. 6B, and possibly not all operations in FIG. 3 to FIG. 6A and FIG. 6B need to be performed.

Figure 3:
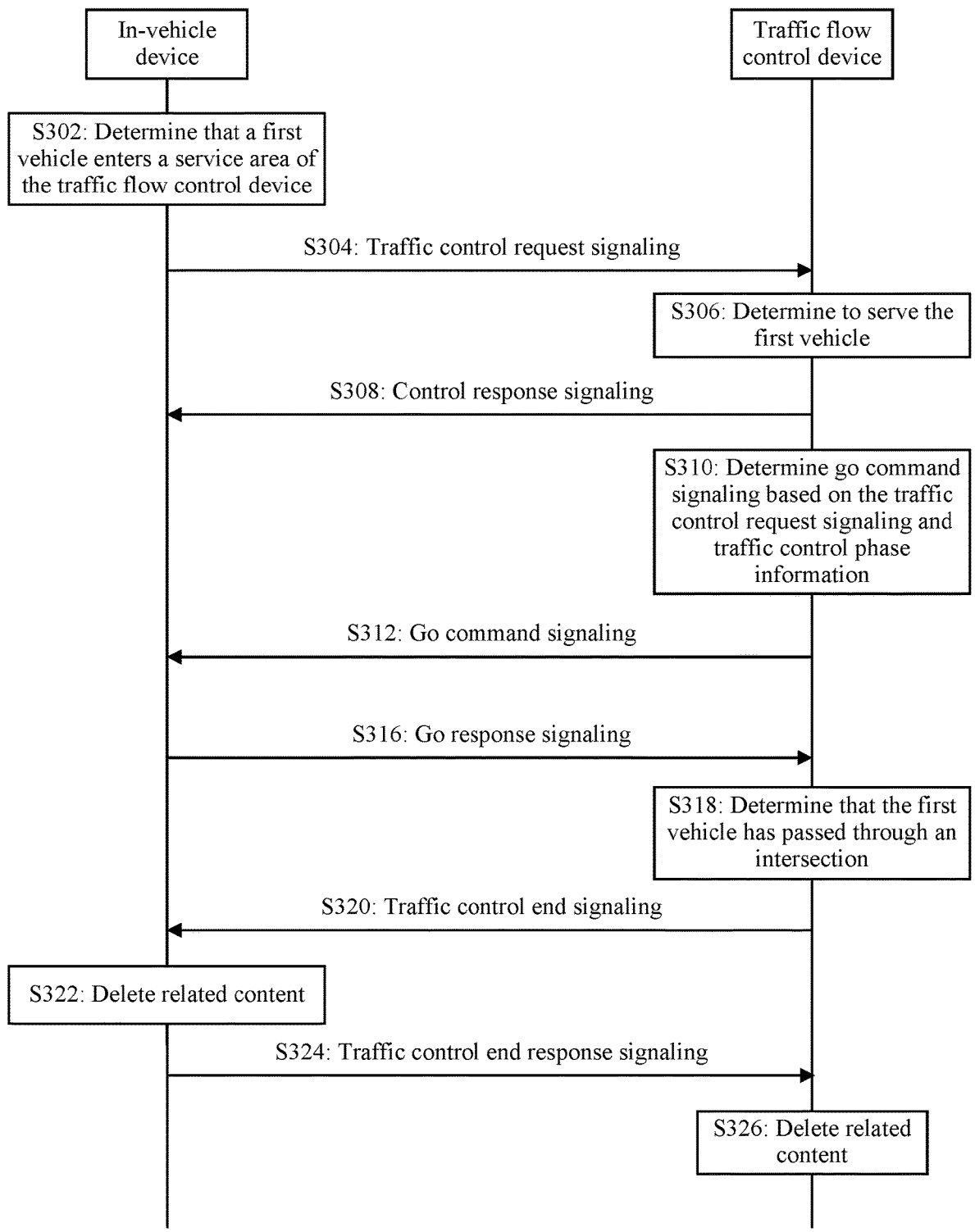
FIG. 3 is a schematic flowchart of a traffic flow control method according to another embodiment of this application.

A traffic flow control method shown in FIG. 3 may include S302 to S326.

S302: An in-vehicle device on a first vehicle determines that the vehicle has entered a service area of a traffic flow control device.

S304: The in-vehicle device of the first vehicle sends traffic control request signaling to the traffic flow control device. In one embodiment, the traffic control request signaling may include travel information of the first vehicle and a travel intention of the first vehicle.

Correspondingly, the traffic flow control device receives the traffic control request signaling sent by the in-vehicle device of the first vehicle.

S306: The traffic flow control device determines to serve the first vehicle.

S308: The traffic flow control device sends control response signaling to the in-vehicle device of the first vehicle, to notify the in-vehicle device that "the traffic flow control device is to serve the first vehicle".

Correspondingly, the in-vehicle device of the first vehicle receives the control response signaling.

S310: The traffic flow control device determines go command signaling for the first vehicle based on the travel information of the first vehicle, the travel intention of the first vehicle, and traffic control phase information of a target intersection.

For this step, refer to a related operation in the traffic flow control method shown in FIG. 2. Details are not described herein again.

S312: The traffic flow control device sends the go command signaling to the in-vehicle device of the first vehicle, to instruct the first vehicle to go. Correspondingly, the in-vehicle device of the first vehicle receives the go command signaling.

A control unit on the first vehicle controls, based on the go command signaling received by the in-vehicle device and sensed data of the first vehicle, the first vehicle to go. Alternatively, a prompt unit on the first vehicle instructs a driver to drive the first vehicle to travel off an entrance lane and travel into an exit lane, that is, to pass through an intersection.

For example, the first vehicle may adjust a vehicle speed to pass through the intersection under control of the control unit or the driver.

S316: The in-vehicle device of the first vehicle sends go response signaling to the traffic flow control device. Correspondingly, the traffic flow control device receives the go response signaling.

S318: The traffic flow control device determines that the first vehicle has passed through the intersection.

For example, the traffic flow control device may determine, by monitoring location information of the first vehicle, that the first vehicle has passed through the intersection.

S320: The traffic flow control device sends traffic control end signaling to the in-vehicle device. Correspondingly, the in-vehicle device receives the traffic control end signaling.

S322: The in-vehicle device deletes, according to the traffic control end signaling, content related to the case in which the first vehicle passes through the intersection.

S324: The in-vehicle device sends traffic control end response signaling to the traffic flow control device. Correspondingly, the traffic flow control device receives the traffic control end response signaling.

S326: The traffic flow control device deletes content related to the case in which the first vehicle passes through the intersection, to end the current traffic command.

Figure 4A:
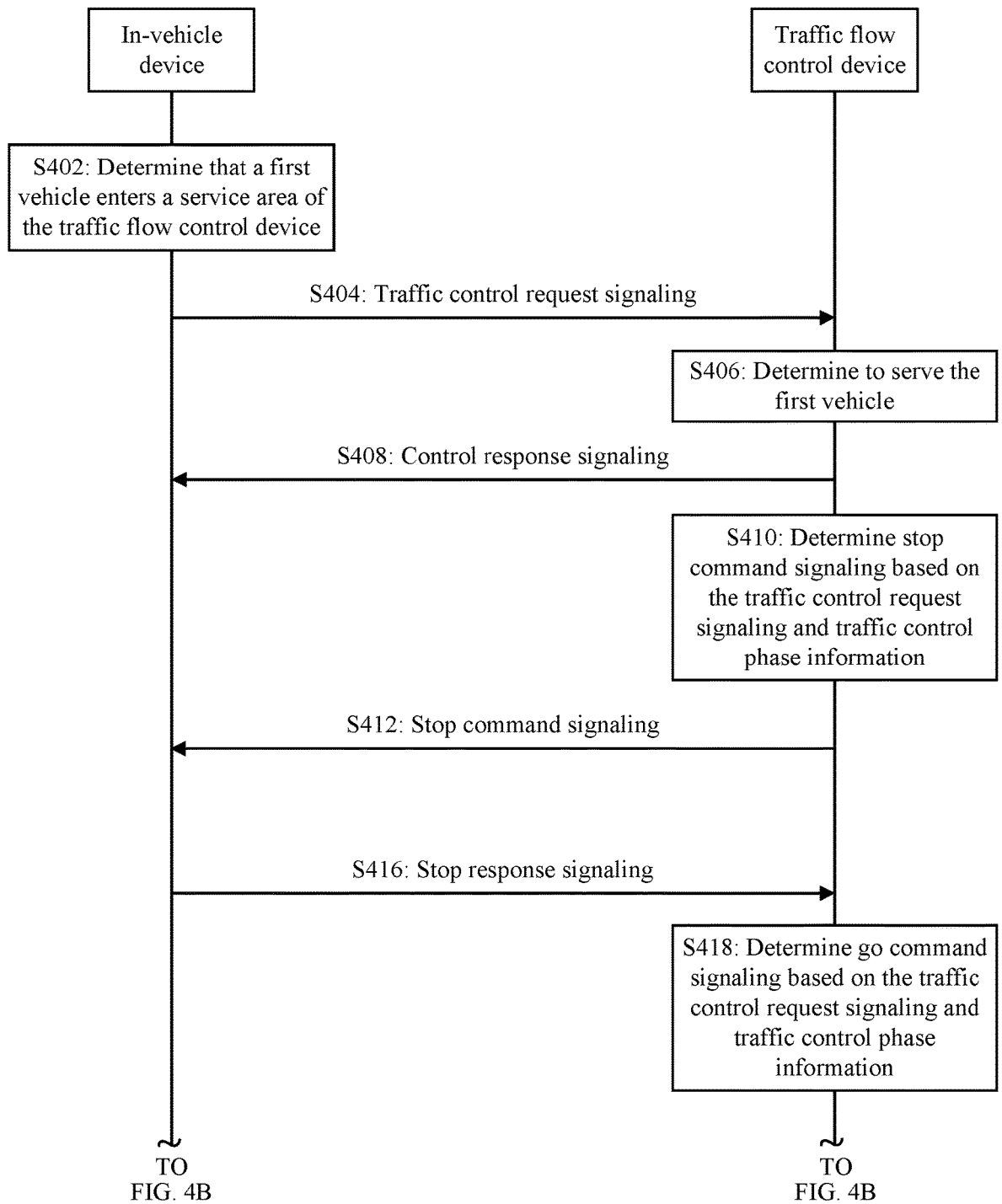
FIG. 4A and FIG. 4B are a schematic flowchart of a traffic flow control method according to another embodiment of this application.
Figure 4B:
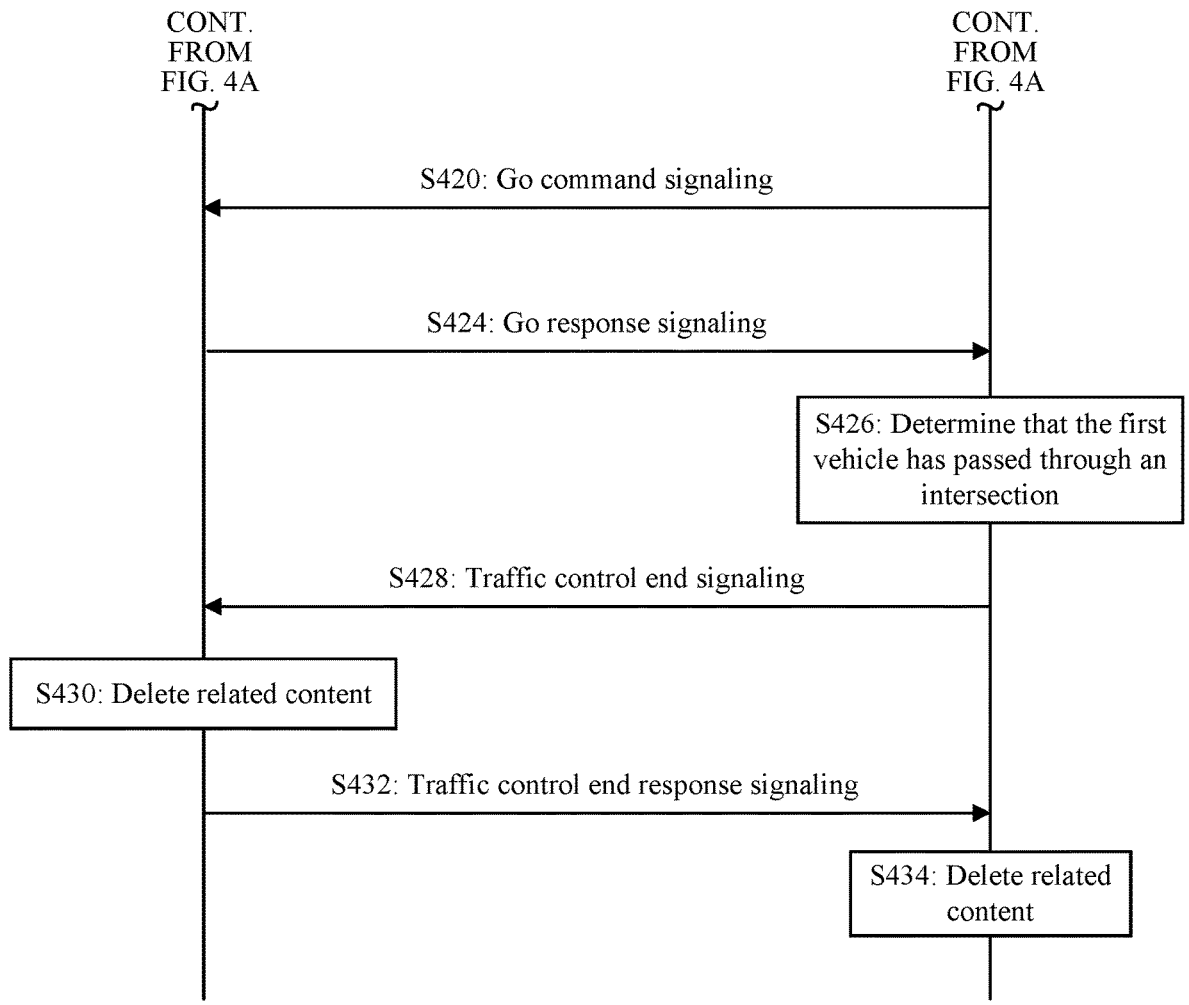

A traffic flow control method shown in FIG. 4A and FIG. 4B may include S402 to S434.

For S402 to S408, refer to S302 to S308. Details are not described herein again.

S410: The traffic flow control device determines stop command signaling for the first vehicle based on the travel information of the first vehicle, traffic control phase information of a target intersection, and the travel intention of the first vehicle, to instruct the first vehicle to stop.

For this step, refer to a related operation in the traffic flow control method shown in FIG. 2. Details are not described herein again.

S412: The traffic flow control device sends the stop command signaling to the in-vehicle device of the first vehicle, to instruct the first vehicle to stop before a stopline. Correspondingly, the in-vehicle device of the first vehicle receives the stop command signaling.

A control unit on the first vehicle controls, based on the stop command signaling received by the in-vehicle device and sensed data of the first vehicle, the first vehicle to stop. Alternatively, a prompt unit on the first vehicle instructs a driver to stop the first vehicle.

For example, under control of the control unit or the driver, the first vehicle may adjust a vehicle speed and stop before arriving at a stopline of an entrance lane.

S416: The in-vehicle device of the first vehicle sends stop response signaling to the traffic flow control device. Correspondingly, the traffic flow control device receives the stop response signaling.

S418: When a traffic control phase at the target intersection switches to or switches again to a green-go phase, the traffic flow control device determines, for the first vehicle, go command signaling used for instructing the first vehicle to go.

For S420 to S434, refer to S312 to S326. Details are not described herein again.

Figure 5A:
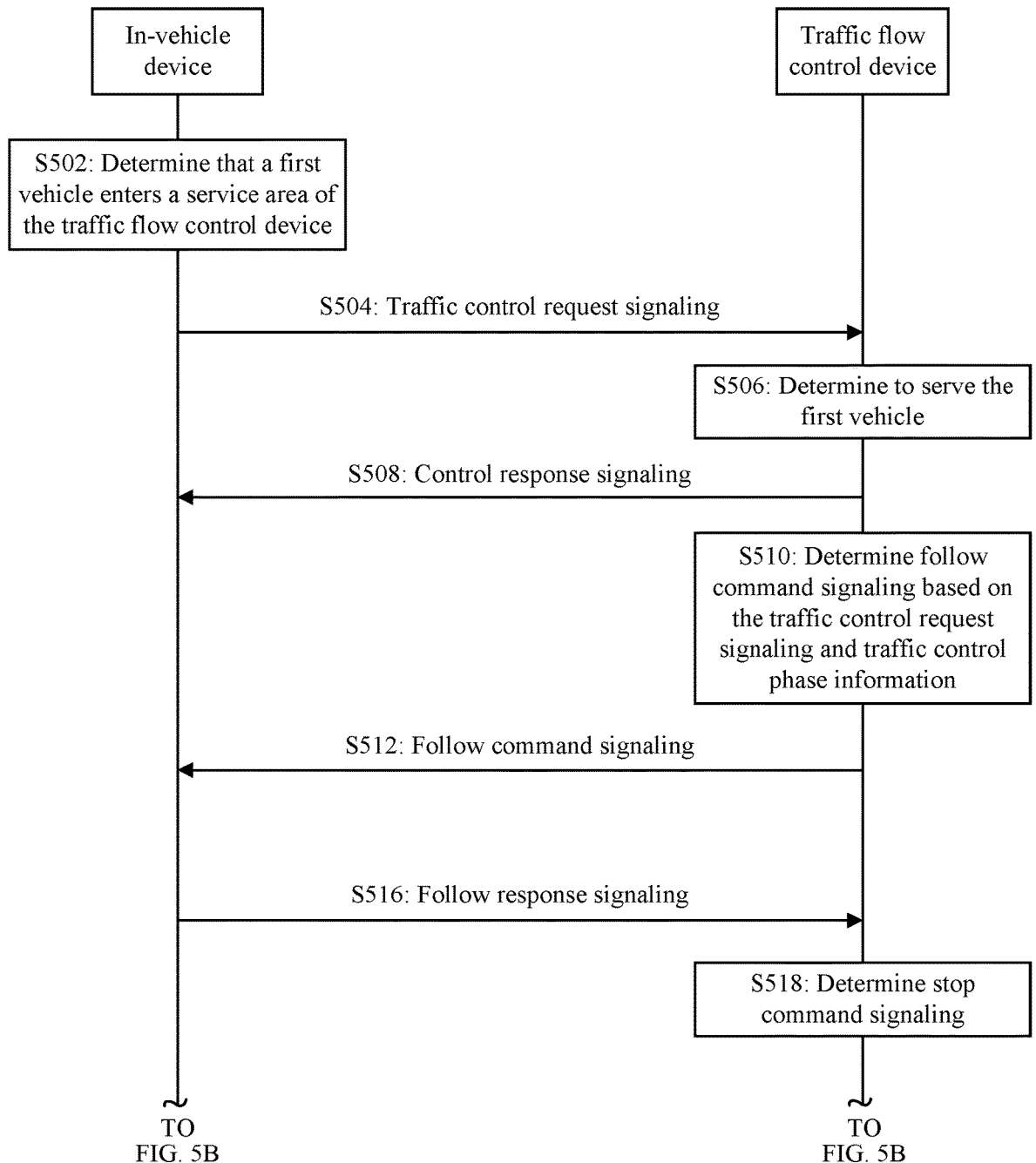
FIG. 5A and FIG. 5B are a schematic flowchart of a traffic flow control method according to another embodiment of this application.
Figure 5B:
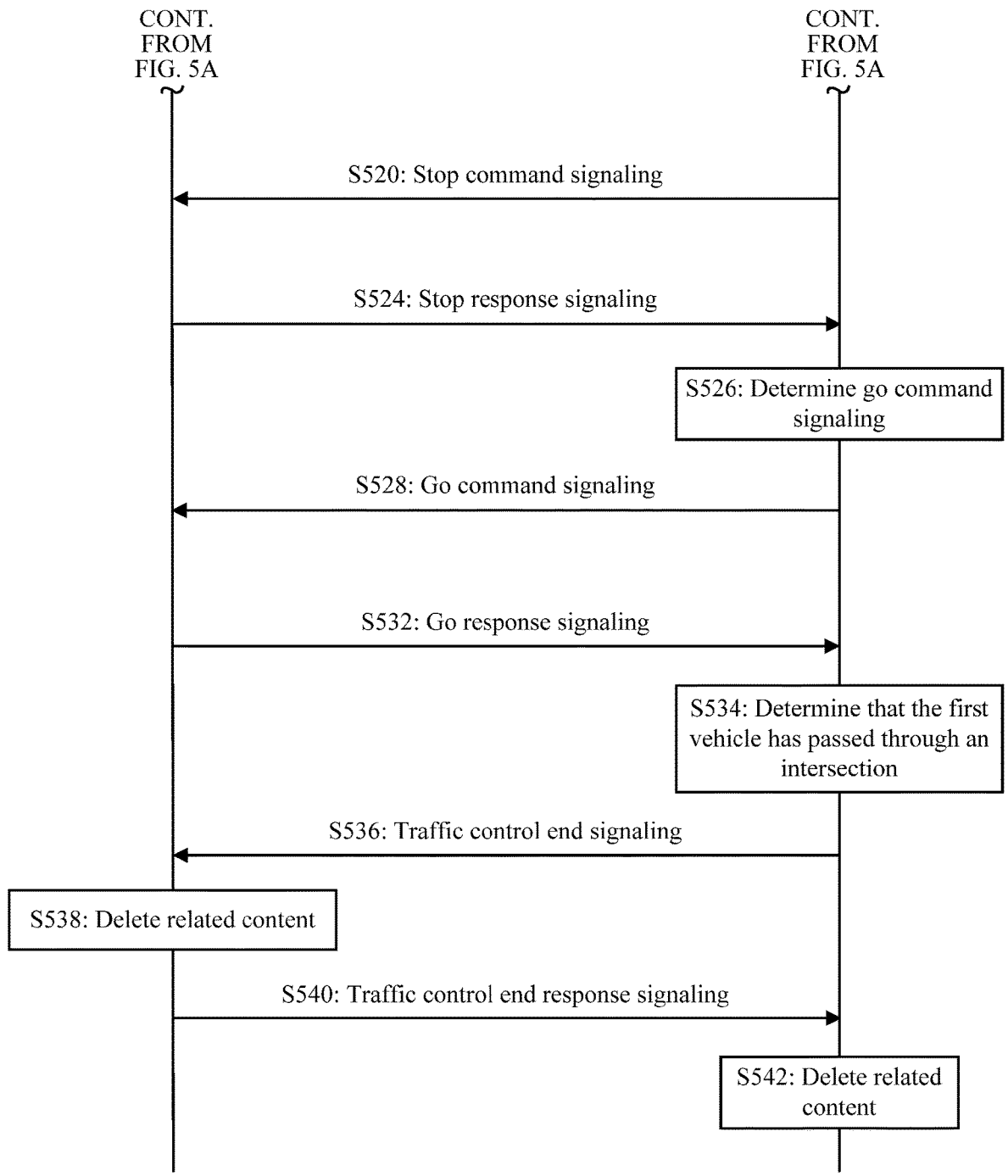

A traffic flow control method shown in FIG. 5A and FIG. 5B may include S502 to S542.

For S502 to S508, refer to S302 to S308. Details are not described herein again.

S510: The traffic flow control device determines follow command signaling for the first vehicle.

For this step, refer to a related operation in the traffic flow control method shown in FIG. 2. Details are not described herein again.

S512: The traffic flow control device sends the follow command signaling to the in-vehicle device of the first vehicle. Correspondingly, the in-vehicle device of the first vehicle receives the follow command signaling used for instructing the first vehicle to follow a vehicle.

A control unit on the first vehicle controls, based on the follow command signaling received by the in-vehicle device and sensed data of the first vehicle, the first vehicle to follow a vehicle. Alternatively, a prompt unit on the first vehicle instructs a driver to drive the first vehicle to follow a second vehicle in traveling.

S516: The in-vehicle device of the first vehicle sends follow response signaling to the traffic flow control device.

S518: In a process in which the first vehicle follows a second vehicle in traveling, when a traffic control phase at a target intersection is a green-go phase, and a remaining time of the green-go phase is sufficient for the second vehicle to travel off a stopline of a lane in which the first vehicle is located, but is not sufficient for the first vehicle to travel off the stopline of the lane in which the first vehicle is located, the traffic flow control device determines stop command signaling for the first vehicle.

For this step, refer to a related operation in the traffic flow control method shown in FIG. 2. Details are not described herein again.

S520: The traffic flow control device sends the stop command signaling to the in-vehicle device of the first vehicle. Correspondingly, the in-vehicle device of the first vehicle receives the stop command signaling.

A control unit on the first vehicle controls, based on the stop command signaling received by the in-vehicle device and sensed data of the first vehicle, the first vehicle to stop. Alternatively, a prompt unit on the first vehicle instructs a driver to stop the first vehicle.

S524: The in-vehicle device of the first vehicle sends stop response signaling to the traffic flow control device. Correspondingly, the traffic flow control device receives the stop response signaling.

S526: When the traffic control phase at the target intersection switches again to the green-go phase, the traffic flow control device determines go command signaling for the first vehicle.

For this step, refer to a related operation in the traffic flow control method shown in FIG. 2. Details are not described herein again.

For S528 to S542, refer to S312 to S326. Details are not described herein again.

In one embodiment, S518 to S532 may be alternatively that the first vehicle follows the second vehicle in traveling until the first vehicle travels off the intersection.

Figure 6A:
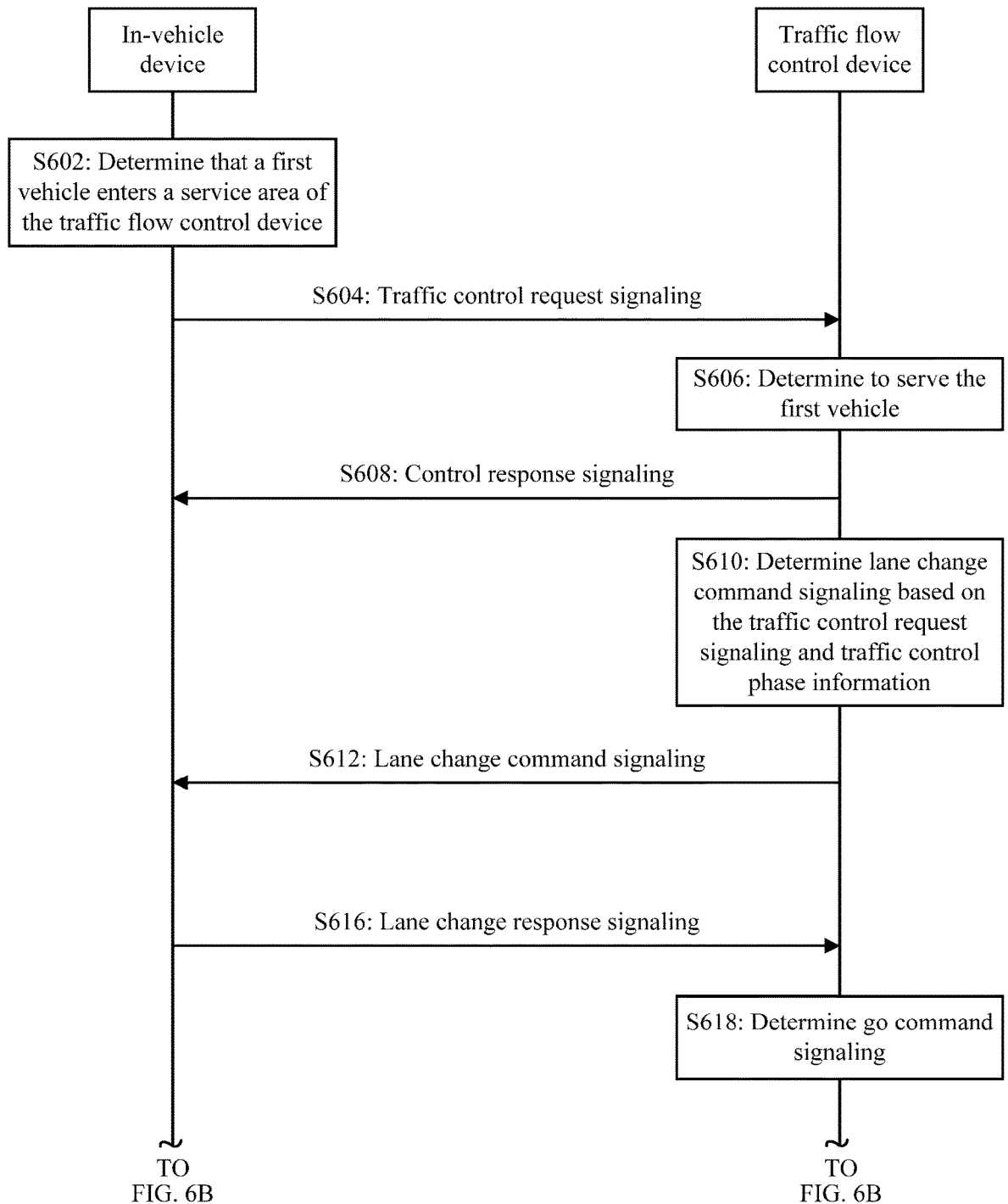
FIG. 6A and FIG. 6B are a schematic flowchart of a traffic flow control method according to another embodiment of this application.
Figure 6B:
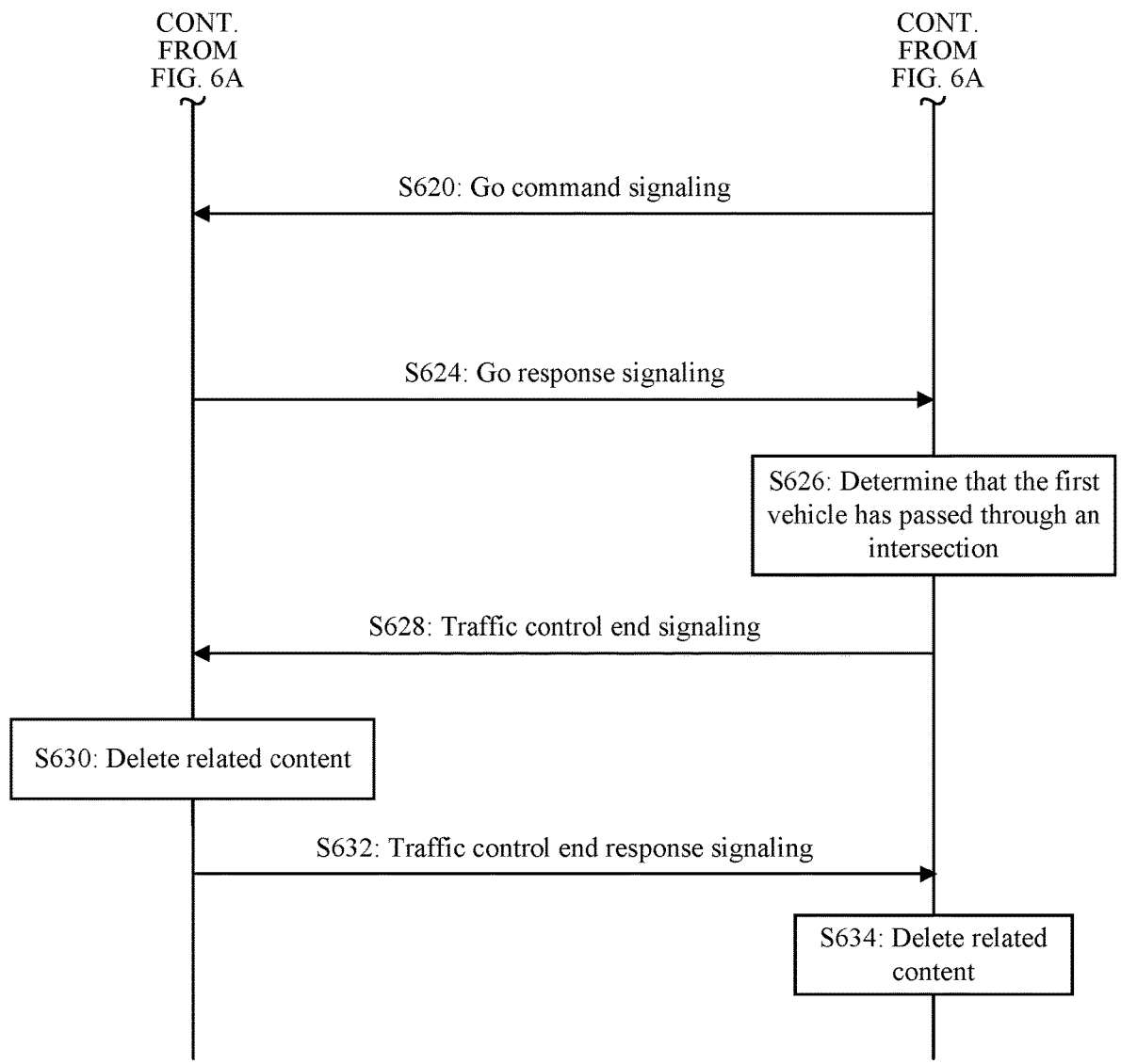

A traffic flow control method shown in FIG. 6A and FIG. 6B may include S602 to S634.

For S602 to S608, refer to S302 to S308. Details are not described herein again.

S610: The traffic flow control device determines lane change command signaling for the first vehicle based on the travel information of the first vehicle, traffic control phase information of a target intersection, and the travel intention of the first vehicle, to instruct the first vehicle to change lane.

For this step, refer to a related operation in the traffic flow control method shown in FIG. 2. Details are not described herein again.

S612: The traffic flow control device sends the lane change command signaling to the in-vehicle device of the first vehicle, to instruct the first vehicle to change lane. Correspondingly, the in-vehicle device of the first vehicle receives the lane change command signaling.

A control unit on the first vehicle controls, based on the lane change command signaling received by the in-vehicle device and sensed data of the first vehicle, the first vehicle to change lane. Alternatively, a prompt unit on the first vehicle instructs a driver to change lane.

For this step, refer to a related operation in the traffic flow control method shown in FIG. 2. Details are not described herein again.

S616: The in-vehicle device of the first vehicle sends lane change response signaling to the traffic flow control device. Correspondingly, the traffic flow control device receives the lane change response signaling.

For S618 to S634, refer to S310 to S326. Details are not described herein again.

After the first vehicle completes the lane change and before S618, the traffic flow control device may send stop command signaling, go command signaling, or follow command signaling to the first vehicle, where the stop command signaling includes traffic control phase information of an intersection ahead of the first vehicle and location information of a stopline of an entrance lane, the go command signaling includes the traffic control phase information of the intersection ahead of the first vehicle and information about an exit lane, and the follow command signaling includes identification information of a vehicle ahead of the first vehicle.

Correspondingly, the first vehicle stops, goes, or follows a vehicle according to the traffic command received by the in-vehicle device. For a specific implementation, refer to the foregoing method. Details are not described herein again.

In the foregoing embodiments, cases in which the traffic flow control device is applied at an intersection are described. Another traffic flow control device provided in this application may be applied in a non-intersection case. In this case, in the traffic flow control method in the embodiments of this application, the traffic flow control device receives traffic control request signaling sent by a first vehicle, where the traffic control request signaling includes current travel information of the first vehicle and a travel intention of the first vehicle; the traffic flow control device determines follow command signaling based on the traffic control request signaling, where the follow command signaling includes identification information of a second vehicle that travels ahead of the first vehicle; and the traffic flow control device sends the follow command signaling to the first vehicle.

Correspondingly, an in-vehicle device sends traffic control request signaling to a traffic flow control device, where the traffic control request signaling includes travel information of a first vehicle to which the in-vehicle device belongs and a travel intention of the first vehicle; the in-vehicle device receives follow command signaling sent by the traffic flow control device, so that the first vehicle travels according to traffic command signaling. The follow command signaling includes identification information of a second vehicle that travels ahead of the first vehicle, and the follow command signaling is determined by the traffic flow control device based on the traffic control request signaling.

It should be understood that the travel intention of the first vehicle described herein may be a destination of the first vehicle, or may be a road segment through which the first vehicle is likely to pass during traveling to the destination.

In one embodiment, the travel information of the first vehicle may include a location of the first vehicle and a lane in which the first vehicle is located.

That the traffic flow control device determines follow command signaling based on the traffic control request signaling may include: The traffic flow control device determines the follow command signaling when the traffic flow control device determines, based on the travel information of the first vehicle, that the first vehicle and the second vehicle are in the same lane, and a distance between the second vehicle and the first vehicle is less than a preset distance threshold, and the traffic flow control device determines that the travel intention of the first vehicle is the same as a travel intention of the second vehicle.

According to the traffic flow control method, the traffic flow control device does not need to control traveling of the first vehicle in real time, thereby saving resources.

It should be understood that the travel intention of the second vehicle described herein may be a destination of the second vehicle, or may be a road segment through which the second vehicle is likely to pass during traveling to the destination.

In this embodiment, optionally, the follow command signaling may further include information about the second vehicle such as a location, a speed, a physical size, a weight, a recommended distance, and the travel intention of the second vehicle.

Figure 7:
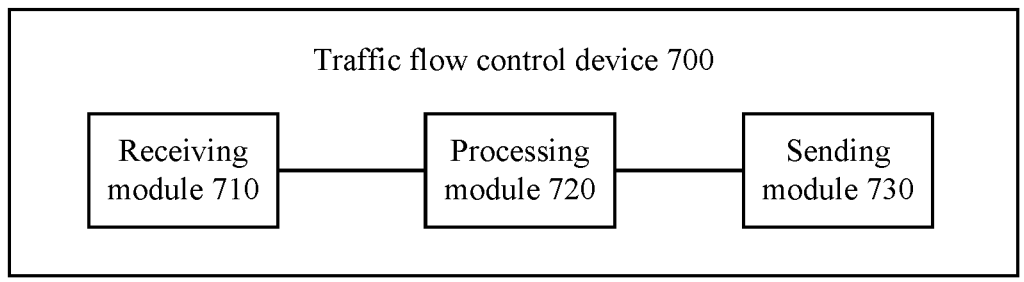
FIG. 7 is a schematic flowchart of a traffic flow control device according to an embodiment of this application.

A schematic structural diagram of a traffic flow control device according to an embodiment of this application is shown in FIG. 7. It should be understood that the traffic flow control device 700 shown in FIG. 7 is only an example. The traffic flow control device in this embodiment of this application may further include another module or unit, or include modules with functions similar to those of modules in FIG. 7, or not necessarily include all modules in FIG. 7.

The traffic flow control device 700 shown in FIG. 7 may include a receiving module 710, a processing module 720, and a sending module 730.

The receiving module 710 is configured to receive traffic control request signaling sent by an in-vehicle device of a first vehicle, where the traffic control request signaling includes travel information of the first vehicle and a travel intention of the first vehicle.

The processing module 720 is configured to determine traffic command signaling based on the traffic control request signaling and traffic control phase information of a target intersection, where the target intersection is an intersection through which the first vehicle is to pass.

The sending module 730 sends the traffic command signaling to the in-vehicle device of the first vehicle.

In one embodiment, the processing module 720 is further configured to: determine an entrance lane and an exit lane of the first vehicle at the target intersection based on the travel information, the travel intention, and lane information of the target intersection, where the entrance lane is a lane that is allocated by the traffic flow control device to the first vehicle for entering the target intersection, and the exit lane is a lane that is allocated by the traffic flow control device to the first vehicle for exiting from the target intersection; or determine an entrance lane and an exit lane of the first vehicle at the target intersection based on the travel information, the travel intention, lane information of the target intersection, and traffic flow information of the target intersection.

In one embodiment, the travel information includes a location of the first vehicle and a speed of the first vehicle.

Correspondingly, the processing module is configured to:

determine a first time based on the speed of the first vehicle, the location of the first vehicle, and a lane in which the first vehicle is located, where the first time is a time required for the first vehicle to travel off a stopline of the lane in which the first vehicle is located from the location of the first vehicle along the lane in which the first vehicle is located, and the lane in which the first vehicle is located is obtained by the traffic flow control device through calculation based on the location of the first vehicle and the lane information of the target intersection, or the lane in which the first vehicle is located is carried in the travel information.

In one embodiment, the travel information further includes an acceleration of the first vehicle.

The processing module is configured to determine the first time based on the speed of the first vehicle, the location of the first vehicle, the lane in which the first vehicle is located, and the acceleration of the first vehicle.

In one embodiment, the travel information includes a location of the first vehicle.

The processing module is configured to:

determine a first time based on a preset vehicle speed at the target intersection, the location of the first vehicle, and a lane in which the first vehicle is located, where the first time is a time required for the first vehicle to travel off a stopline of the lane in which the first vehicle is located from the location of the first vehicle along the lane in which the first vehicle is located, and the lane in which the first vehicle is located is obtained by the traffic flow control device through calculation based on the location of the first vehicle and the lane information of the target intersection, or the lane in which the first vehicle is located is carried in the travel information.

In one embodiment, the processing module is configured to:

when a traffic control phase corresponding to the traffic control phase information of the target intersection is a green-go phase, and a remaining time of the green-go phase is longer than or equal to the first time, determine that the traffic command signaling is go command signaling, where the go command signaling includes the traffic control phase information of the target intersection and information about the exit lane.

In one embodiment, the processing module is configured to:

when a traffic control phase corresponding to the traffic control phase information of the target intersection is a green-go phase, and a remaining time of the green-go phase is shorter than the first time, determine that the traffic command signaling is first stop command signaling, where the first stop command signaling includes the traffic control phase information of the target intersection and location information of the stopline of the lane in which the first vehicle is located.

In one embodiment, the sending module is further configured to:

when the traffic control phase corresponding to the traffic control phase information of the target intersection switches again to the green-go phase, and the traffic flow control device learns through monitoring that the first vehicle has traveled to the stopline, send go command signaling to the in-vehicle device, where the go command signaling includes the traffic control phase information of the target intersection and information about the exit lane; or when the traffic control phase corresponding to the traffic control phase information of the target intersection switches again to the green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is shorter than or equal to a remaining time of the green-go phase to which the traffic control phase switches again, send go command signaling to the in-vehicle device, where the go command signaling includes the traffic control phase information of the target intersection and information about the exit lane; or when the traffic control phase corresponding to the traffic control phase information of the target intersection switches again to the green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is longer than a remaining time of the green-go phase to which the traffic control phase switches again, send second stop command signaling to the in-vehicle device, where the second stop command signaling includes the traffic control phase information of the target intersection and the location information of the stopline of the lane in which the first vehicle is located.

In one embodiment, the processing module is configured to:

when a traffic control phase corresponding to current traffic control phase information of the target intersection is a red-stop phase, determine that the traffic command signaling is first stop command signaling, where the first stop command signaling includes the traffic control phase information of the target intersection and location information of the stopline of the lane in which the first vehicle is located.

In one embodiment, the sending module is further configured to:

when the traffic control phase corresponding to the traffic control phase information of the target intersection switches to a green-go phase, and the traffic flow control device learns through monitoring that the first vehicle has traveled to the stopline, send go command signaling to the in-vehicle device, where the go command signaling includes the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is shorter than or equal to a remaining time of the green-go phase, send go command signaling to the in-vehicle device, where the go command signaling includes the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the lane in which the first vehicle is located from a current location of the first vehicle at a current speed and acceleration of the first vehicle along the lane in which the first vehicle is located is longer than a remaining time of the green-go phase, send second stop command signaling to the in-vehicle device, where the second stop command signaling includes the traffic control phase information of the target intersection and location information of the stopline of the lane in which the first vehicle is located.

In one embodiment, the processing module is configured to:

when a traffic control phase corresponding to the traffic control phase information of the target intersection is a green-go phase, and a remaining time of the green-go phase is longer than or equal to the first time, determine that the traffic command signaling is go command signaling, where the go command signaling includes the traffic control phase information of the target intersection, information about the exit lane, and the preset vehicle speed at the target intersection.

In one embodiment, the processing module is configured to:

when a traffic control phase corresponding to the traffic control phase information of the target intersection is a green-go phase, and a remaining time of the green-go phase is shorter than the first time, determine that the traffic command signaling is first stop command signaling, where the first stop command signaling includes the traffic control phase information of the target intersection, location information of the stopline of the lane in which the first vehicle is located, and the preset vehicle speed at the target intersection.

In one embodiment, the sending module is further configured to:

when the traffic control phase corresponding to the traffic control phase information of the target intersection switches again to the green-go phase, and the traffic flow control device learns through monitoring that the first vehicle has traveled to the stopline, send go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches again to the green-go phase, and the traffic flow control device learns through monitoring that a time required for the first vehicle to travel off a stopline of the lane in which the first vehicle is located from a current location of the first vehicle at the preset vehicle speed at the target intersection along the lane in which the first vehicle is located is shorter than or equal to a remaining time of the green-go phase to which the traffic control phase switches again, send go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches again to the green-go phase, and the traffic flow control device learns through monitoring that a time required for the first vehicle to travel off the stopline of the lane in which the first vehicle is located from a current location of the first vehicle at the preset vehicle speed at the target intersection along the lane in which the first vehicle is located is longer than a remaining time of the green-go phase to which the traffic control phase switches again, send second stop command signaling to the in-vehicle device, where the second stop command signaling includes the traffic control phase information of the target intersection, the location information of the stopline of the lane in which the first vehicle is located, and the preset vehicle speed at the target intersection.

In one embodiment, the processing module is configured to:

when a traffic control phase corresponding to the traffic control phase information of the target intersection is a red-stop phase, determine that the traffic command signaling is first stop command signaling, where the first stop command signaling includes the traffic control phase information of the target intersection, location information of the stopline of the lane in which the first vehicle is located, and the preset vehicle speed at the target intersection.

In one embodiment, the sending module is further configured to:

when the traffic control phase corresponding to the traffic control phase information of the target intersection switches to a green-go phase, and the traffic flow control device learns through monitoring that the first vehicle has traveled to the stopline, send go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches to a green-go phase, and the traffic flow control device learns through monitoring that a time required for the first vehicle to travel off the stopline of the lane in which the first vehicle is located from a current location of the first vehicle at the preset vehicle speed at the target intersection along the lane in which the first vehicle is located is shorter than or equal to a time of the green-go phase, send go command signaling to the in-vehicle device, where the go command signaling includes the traffic control phase information of the target intersection, information about the exit lane, and the preset vehicle speed at the target intersection; or when the traffic control phase corresponding to the traffic control phase information of the target intersection switches to a green-go phase, and the traffic flow control device learns through monitoring that a time required for the first vehicle to travel off the stopline of the lane in which the first vehicle is located from a current location of the first vehicle at the preset vehicle speed at the target intersection along the lane in which the first vehicle is located is longer than a time of the green-go phase, send second stop command signaling to the in-vehicle device, where the second stop command signaling includes the traffic control phase information of the target intersection, the location information of the stopline of the lane in which the first vehicle is located, and the preset vehicle speed at the target intersection.

In one embodiment, the processing module is configured to:

after the first time, when a traffic control phase corresponding to the traffic control phase information of the target intersection is a green-go phase, determine that the traffic command signaling is go command signaling, where the go command signaling includes traffic control phase information of the target intersection obtained after the first time and information about the exit lane; or after the first time, when a traffic control phase corresponding to the traffic control phase information of the target intersection is a red-stop phase, determine that the traffic command signaling is stop command signaling, where the stop command signaling includes traffic control phase information of the target intersection obtained after the first time and location information of the stopline of the lane in which the first vehicle is located.

In one embodiment, the processing module is configured to:

after the first time, when a traffic control phase corresponding to the traffic control phase information of the target intersection is a green-go phase, determine that the traffic command signaling is go command signaling, where the go command signaling includes traffic control phase information of the target intersection obtained after the first time, the preset vehicle speed at the target intersection, and information about the exit lane; or after the first time, when a traffic control phase corresponding to the traffic control phase information of the target intersection is a red-stop phase, determine that the traffic command signaling is stop command signaling, where the stop command signaling includes traffic control phase information of the target intersection obtained after the first time, the preset vehicle speed at the target intersection, and location information of the stopline of the lane in which the first vehicle is located.

In one embodiment, the processing module is configured to:

when a distance between the first vehicle and a second vehicle that travels ahead of the first vehicle and that is located in the lane in which the first vehicle is located is less than a preset distance threshold, send follow command signaling to the in-vehicle device, where the follow command signaling includes identification information of the second vehicle, and the lane in which the first vehicle is located is obtained by the traffic flow control device through calculation based on a location of the first vehicle and the lane information of the target intersection, or the lane in which the first vehicle is located is carried in the travel information.

In one embodiment, the sending module is further configured to:

when a traffic control phase corresponding to the traffic control phase information of the target intersection is a green-go phase, a time required for the second vehicle to travel off a stopline of the lane in which the first vehicle is located from a current location of the second vehicle is shorter than or equal to a remaining time of the green-go phase, and a time required for the first vehicle to travel off the stopline of the lane in which the first vehicle is located from a current location of the first vehicle is longer than the remaining time of the green-go phase, send stop command signaling to the in-vehicle device, where the stop command signaling includes the traffic control phase information of the target intersection and location information of the stopline of the lane in which the first vehicle is located.

In one embodiment, the sending module is further configured to:

when the traffic control phase corresponding to the traffic control phase information of the target intersection switches again to the green-go phase, and the traffic flow control device learns through monitoring that the first vehicle has traveled to the stopline of the lane in which the first vehicle is located, send go command signaling to the in-vehicle device, where the go command signaling includes the traffic control phase information of the target intersection and information about the exit lane.

In one embodiment, the processing module is configured to: when a lane in which the first vehicle is located is not the entrance lane, send lane change command signaling to the in-vehicle device, where the lane change command signaling includes information about the entrance lane, and the lane in which the first vehicle is located is obtained by the traffic flow control device through calculation based on a location of the first vehicle and the lane information of the target intersection, or the lane in which the first vehicle is located is carried in the travel information.

In one embodiment, the sending module is further configured to send stop command signaling or deceleration command signaling to a third vehicle that is in the entrance lane and that is at the rear of the first vehicle, where the stop command signaling includes information about a location at which the third vehicle is to stop, and the deceleration command signaling includes speed information of the third vehicle after deceleration.

In one embodiment, the processing module is configured to: determine a plurality of entrance lanes based on the travel intention and the lane information of the target intersection; determine the entrance lane from the plurality of entrance lanes based on the traffic flow information of the target intersection and the lane in which the first vehicle is located, where the lane in which the first vehicle is located is obtained by the traffic flow control device through calculation based on the location of the first vehicle and the lane information of the target intersection, or the lane in which the first vehicle is located is carried in the travel information;

determine a plurality of exit lanes based on the travel intention and the lane information of the target intersection; and determine the exit lane from the plurality of exit lanes based on the traffic flow information of the target intersection and the entrance lane.

In one embodiment, the traffic control phase information of the target intersection is traffic control phase information that is obtained by the traffic flow control device from a traffic signal light of the target intersection, or is traffic control phase information that is generated by the traffic flow control device.

Optionally, the traffic flow control device 700 may further include a vehicle motion status monitoring module, configured to monitor a vehicle motion status.

In one embodiment, the traffic flow control device may further include a traffic control phase processing module, configured to obtain a traffic control phase.

It should be understood that the traffic flow control device 700 may be configured to perform steps performed by the traffic flow control device in the traffic flow control method shown in FIG. 2. For brevity, details are not described herein again.

Figure 8:
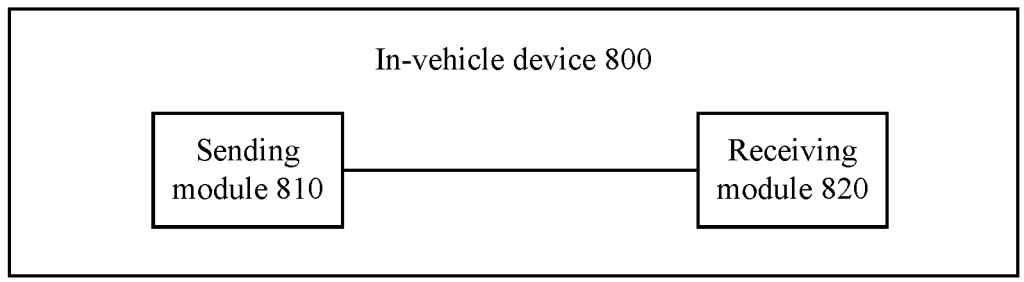
FIG. 8 is a schematic flowchart of an in-vehicle device according to an embodiment of this application.

A schematic structural diagram of an in-vehicle device according to an embodiment of this application is shown in FIG. 8. It should be understood that the in-vehicle device 800 shown in FIG. 8 is only an example. The in-vehicle device in this embodiment of this application may further include another module or unit, or include modules with functions similar to those of modules in FIG. 8, or not necessarily include all modules in FIG. 8.

The in-vehicle device 800 may include a sending module 810 and a receiving module 820. Optionally, the in-vehicle device 800 may further include a control module or a prompt module.

The sending module 810 is configured to send traffic control request signaling to a traffic flow control device, where the traffic control request signaling includes travel information and a travel intention of a first vehicle to which the in-vehicle device belongs.

The receiving module 820 is configured to receive traffic command signaling sent by the traffic flow control device, so that the first vehicle travels according to the traffic command signaling, where the traffic command signaling is determined by the traffic flow control device based on the traffic control request signaling and traffic control phase information of a target intersection, and the target intersection is an intersection through which the first vehicle is to pass.

The control module may be configured to control traveling of the first vehicle according to the traffic command signaling received by the in-vehicle device.

The prompt module may be configured to prompt a driver with the traffic command signaling received by the in-vehicle device, so that the driver drives the first vehicle according to the traffic command signaling.

In one embodiment, the traffic command signaling includes at least one of go command signaling, stop command signaling, follow command signaling, and lane change command signaling, where the go command signaling includes the traffic control phase information of the target intersection and information about an exit lane of the first vehicle at the target intersection, or the go command signaling includes the traffic control phase information of the target intersection, a preset vehicle speed at the target intersection, and information about an exit lane of the first vehicle at the target intersection; the stop command signaling includes traffic control phase information of the target intersection and location information of a stopline of a lane in which the first vehicle is located, or the stop command signaling includes traffic control phase information of the target intersection, location information of a stopline of a lane in which the first vehicle is located, and a preset vehicle speed at the target intersection; the follow command signaling includes identification information of a second vehicle, where the second vehicle is a vehicle that travels ahead of the first vehicle and that is located in the lane in which the first vehicle is located, and a distance between the second vehicle and the first vehicle is less than a preset distance threshold; and the lane change command signaling includes information about an entrance lane of the first vehicle at the target intersection.

In one embodiment, the in-vehicle device 800 may further include a vehicle sensing module, configured to sense a motion status of a vehicle, nearby environment, or the like, to obtain sensed data.

It should be understood that the in-vehicle device 800 may be configured to perform steps performed by the in-vehicle device in the traffic flow control method shown in FIG. 2. For brevity, details are not described herein again.

Figure 9:
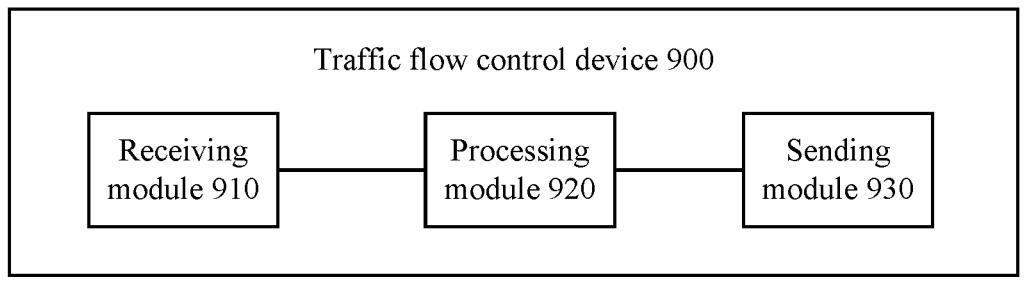
FIG. 9 is a schematic flowchart of a traffic flow control device according to another embodiment of this application.

A schematic structural diagram of a traffic flow control device according to an embodiment of this application is shown in FIG. 9. It should be understood that the traffic flow control device 900 shown in FIG. 9 is only an example. The traffic flow control device in this embodiment of this application may further include another module or unit, or include modules with functions similar to those of modules in FIG. 9, or not necessarily include all modules in FIG. 9.

The traffic flow control device 900 shown in FIG. 9 may include a receiving module 910, a processing module 920, and a sending module 930.

The receiving module 910 is configured to receive traffic control request signaling sent by a first vehicle, where the traffic control request signaling includes current travel information of the first vehicle and a travel intention of the first vehicle.

The processing module 920 is configured to determine follow command signaling based on the traffic control request signaling, where the follow command signaling includes identification information of a second vehicle that travels ahead of the first vehicle.

The sending module 930 is configured to send the follow command signaling to the first vehicle.

In one embodiment, the processing module is configured to determine the follow command signaling when determining, based on the travel information, that the first vehicle and the second vehicle are in a same lane, and a distance between the second vehicle and the first vehicle is less than a preset distance threshold, and determining, based on the travel intention, that the travel intention of the first vehicle is the same as a travel intention of the second vehicle.

Figure 10:
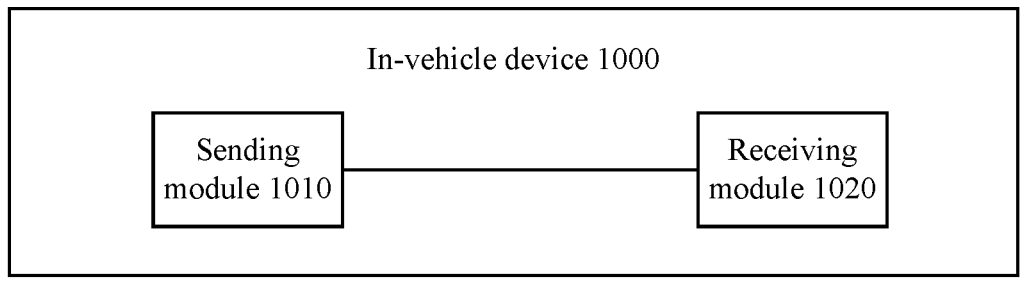
FIG. 10 is a schematic flowchart of an in-vehicle device according to another embodiment of this application.

A schematic structural diagram of an in-vehicle device according to an embodiment of this application is shown in FIG. 10. It should be understood that the in-vehicle device 1000 shown in FIG. 10 is only an example. The in-vehicle device in this embodiment of this application may further include another module or unit, or include modules with functions similar to those of modules in FIG. 10, or not necessarily include all modules in FIG. 10.

The in-vehicle device 1000 may include a sending module 1010 and a receiving module 1020.

The sending module 1010 is configured to send traffic control request signaling to a traffic flow control device, where the traffic control request signaling includes travel information of a first vehicle to which the in-vehicle device belongs and a travel intention of the first vehicle.

The receiving module 1020 is configured for the in-vehicle device to receive follow command signaling sent by the traffic flow control device, so that the first vehicle travels according to the follow command signaling, where the follow command signaling includes identification information of a second vehicle that travels ahead of the first vehicle, and the follow command signaling is determined by the traffic flow control device based on the traffic control request signaling.

In one embodiment, the travel information includes a location of the first vehicle and a lane in which the first vehicle is located.

Figure 11:
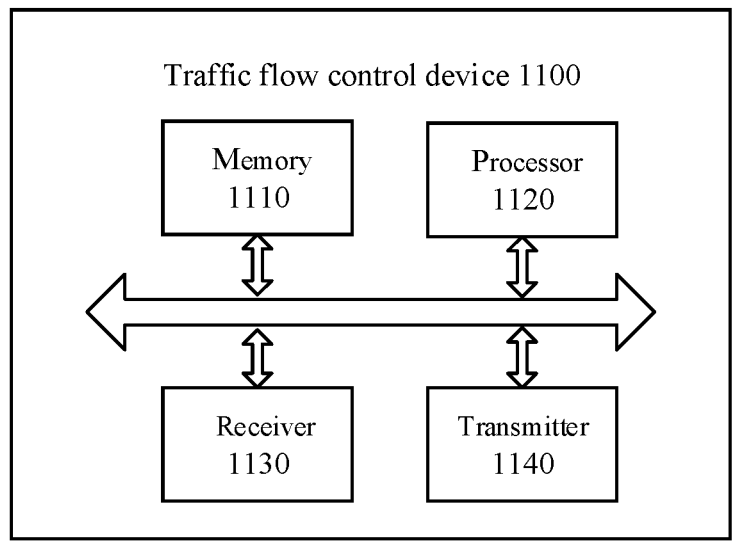
FIG. 11 is a schematic flowchart of a traffic flow control device according to an embodiment of this application.

FIG. 11 is a schematic structural diagram of a traffic flow control device according to another embodiment of this application. It should be understood that the traffic flow control device 1100 shown in FIG. 11 is only an example. The traffic flow control device in this embodiment of this application may further include another module or unit, or include modules with functions similar to those of modules in FIG. 11, or not necessarily include all modules in FIG. 11.

The traffic flow control device 1100 includes a processor 1120, a receiver 1130, and a transmitter 1140. Optionally, the traffic flow control device 1100 may further include a memory 1110. The receiver 1130 and the transmitter 1140 may be integrated together to obtain a transceiver.

The processor 1120 may be configured to implement an operation or a step that is performed by the processing module 720 in FIG. 7. The transmitter 1140 may be configured to implement an operation or a step that is performed by the sending module 730 in FIG. 7. The receiver 1130 may be configured to implement an operation or a step that is performed by the receiving module 710 in FIG. 7.

The memory 1110 is configured to store program code executed by the processor 1120, and the memory may be integrated to the processor 1120.

Figure 12:
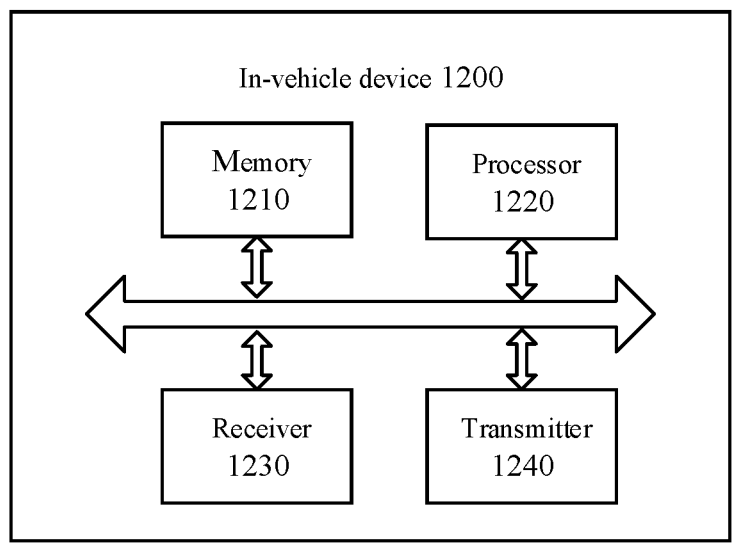
FIG. 12 is a schematic flowchart of an in-vehicle device according to an embodiment of this application.

FIG. 12 is a schematic structural diagram of an in-vehicle device according to another embodiment of this application. It should be understood that the in-vehicle device 1200 shown in FIG. 12 is only an example. The in-vehicle device in this embodiment of this application may further include another module or unit, or include modules with functions similar to those of modules in FIG. 12, or not necessarily include all modules in FIG. 12.

The in-vehicle device 1200 includes a processor 1220, a receiver 1230, and a transmitter 1240. Optionally, the in-vehicle device 1200 may further include a memory 1210. The receiver 1230 and the transmitter 1240 may be integrated together to obtain a transceiver.

The processor 1220 may be configured to execute program code to control the receiver and the transmitter. The transmitter 1240 may be configured to implement an operation or a step that is performed by the sending module 810 in FIG. 8. The receiver 1230 may be configured to implement an operation or a step that is performed by the receiving module 820 in FIG. 8.

The memory 1210 is configured to store program code executed by the processor 1220, and the memory may be integrated to the processor 1220.

Figure 13:
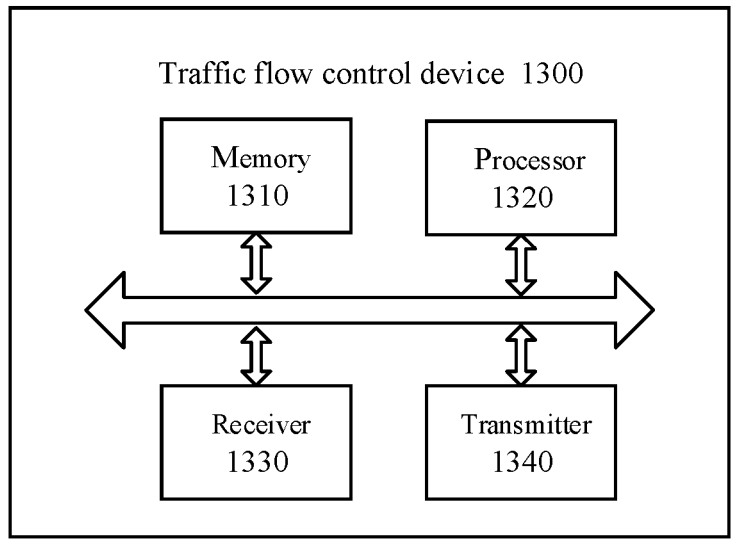
FIG. 13 is a schematic flowchart of a traffic flow control device according to another embodiment of this application.

FIG. 13 is a schematic structural diagram of a traffic flow control device according to another embodiment of this application. It should be understood that the traffic flow control device 1300 shown in FIG. 13 is only an example.

The traffic flow control device in this embodiment of this application may further include another module or unit, or include modules with functions similar to those of modules in FIG. 13, or not necessarily include all modules in FIG. 13.

The traffic flow control device 1300 includes a processor 1320, a receiver 1330, and a transmitter 1340. Optionally, the traffic flow control device 1300 may further include a memory 1310. The receiver 1330 and the transmitter 1340 may be integrated together to obtain a transceiver.

The processor 1320 may be configured to implement an operation or a step that is performed by the processing module 920 in FIG. 9. The transmitter 1340 may be configured to implement an operation or a step that is performed by the sending module 930 in FIG. 9. The receiver 1330 may be configured to implement an operation or a step that is performed by the receiving module 910 in FIG. 9.

The memory 1310 is configured to store program code executed by the processor 1320, and the memory may be integrated to the processor 1320.

Figure 14:
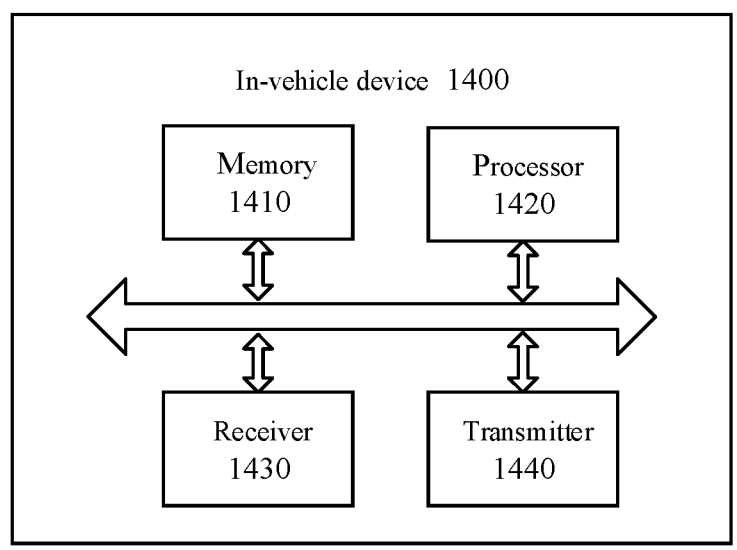
FIG. 14 is a schematic flowchart of an in-vehicle device according to another embodiment of this application.

FIG. 14 is a schematic structural diagram of an in-vehicle device according to another embodiment of this application. It should be understood that the in-vehicle device 1400 shown in FIG. 14 is only an example. The in-vehicle device in this embodiment of this application may further include another module or unit, or include modules with functions similar to those of modules in FIG. 14, or not necessarily include all modules in FIG. 14.

The in-vehicle device 1400 includes a processor 1420, a receiver 1430, and a transmitter 1440. Optionally, the in-vehicle device 1400 may further include a memory 1410. The receiver 1430 and the transmitter 1440 may be integrated together to obtain a transceiver.

The processor 1420 may be configured to execute program code to control the receiver and the transmitter. The transmitter 1440 may be configured to implement an operation or a step that is performed by the sending module 1010 in FIG. 10. The receiver 1430 may be configured to implement an operation or a step that is performed by the receiving module 1020 in FIG. 10.

The memory 1410 is configured to store program code executed by the processor 1420, and the memory may be integrated to the processor 1420.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that for convenient and brief description, for a detailed working process of the foregoing system, apparatus, or unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are only examples. For example, the unit division is only logical function division and may be other division in actual implementation. For example, a plurality of units or components may be combined or integrated into another system, or some features may be ignored or may be not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, an apparatus, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A traffic flow control method in an internet of vehicles, comprising:
    receiving, by a traffic flow control device, traffic control request signaling sent by an in-vehicle device of a first vehicle, wherein the traffic control request signaling comprises travel information and a travel intention of the first vehicle;
    determining, by the traffic flow control device, traffic command signaling based on the traffic control request signaling and traffic control phase information of a target intersection through which the first vehicle is to pass;
    sending, by the traffic flow control device, the traffic command signaling to the in-vehicle device; and
    determining, by the traffic flow control device, an entrance lane of the first vehicle at the target intersection based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes;
    determining, by the traffic flow control device, an exit lane of the first vehicle at the target intersection based on the travel information, the travel intention, and lane information of the target intersection, wherein, the lane information includes data identifying a plurality of second lanes to exit the area within the target intersection, and the exit lane is allocated by the traffic flow control device to the first vehicle from the plurality of second lanes; or determining, by the traffic flow control device, an entrance lane and an exit lane of the first vehicle at the target intersection based on the travel information, the travel intention lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated by the traffic flow control device to the first vehicle from the plurality of first lanes and the exit lane is allocated by the traffic flow control device to the first vehicle from the plurality of second lanes, wherein the travel information comprises a location of the first vehicle and a speed of the first vehicle; and determining, by the traffic flow control device, a first time based on the speed of the first vehicle, the location of the first vehicle, and a current lane in which the first vehicle is located, wherein the first time is a time required for the first vehicle to travel off a stopline of the current lane from the location of the first vehicle along the current lane, and the current lane is obtained by the traffic flow control device through calculation based on the location of the first vehicle and the lane information of the target intersection, or the current lane is carried in the travel information, wherein the determining, by the traffic flow control device, traffic command signaling based on the traffic control request signaling and traffic control phase information of a target intersection comprises;

when a traffic control phase corresponding to the traffic control phase information of the target intersection is a green-go phase, and a remaining time of the green-go phase is shorter than the first time, determining, by the traffic flow control device, that the traffic command signaling is first stop command signaling, wherein the first stop command signaling comprises the traffic control phase information of the target intersection and location information of the stopline of the current lane, and when the traffic control phase corresponding to the traffic control phase information of the target intersection switches again to the green-go phase, and the traffic flow control device learns through monitoring that the first vehicle has traveled to the stopline, sending by the traffic flow control device, go command signaling to the in-vehicle device, wherein the go command signaling comprises the traffic control phase information of the target intersection and information about the exit lane; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at a current speed and acceleration of the first vehicle along the current lane is shorter than or equal to a remaining time of the green-go phase to which the traffic control phase switches again, sending by the traffic flow control device, go command signaling to the in-vehicle device, wherein the go command signaling comprises the traffic control phase information of the target intersection and information about the exit lane; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at a current speed and acceleration of the first vehicle along the current lane is longer than a remaining time of the green-go phase to which the traffic control phase switches again, sending, by the traffic flow control device, second stop command signaling to the in-vehicle device, wherein the second stop command signaling comprises the traffic control phase information of the target intersection and the location information of the stopline of the current lane.

2. The traffic flow control method according to claim 1, wherein the travel information further comprises an acceleration of the first vehicle, wherein
the determining, by the traffic flow control device, a first time based on the speed of the first vehicle, the location of the first vehicle, and a current lane in which the first vehicle is located comprises:
determining, by the traffic flow control device, the first time based on the speed of the first vehicle, the location of the first vehicle, the current lane, and the acceleration of the first vehicle.

3. The traffic flow control method according to claim 1, wherein the travel information comprises a location of the first vehicle; and
the traffic flow control method further comprises:
determining, by the traffic flow control device, a first time based on a preset vehicle speed at the target intersection, the location of the first vehicle, and a current lane in which the first vehicle is located, wherein the first time is a time required for the first vehicle to travel off a stopline of the current lane from the location of the first vehicle along the current lane, and the current lane is obtained by the traffic flow control device through calculation based on the location of the first vehicle and the lane information of the target intersection, or the current lane is carried in the travel information.

4. The traffic flow control method according to claim wherein the determining, by the traffic flow control device, traffic command signaling based on the traffic control request signaling and traffic control phase information of a target intersection comprises:
when a traffic control phase corresponding to the traffic control phase information of the target intersection is a green-go phase, and a remaining time of the green-go phase is longer than or equal to the first time, determining, by the traffic flow control device, that the traffic command signaling is go command signaling, wherein the go command signaling comprises the traffic control phase information of the target intersection and information about the exit lane.

5. The traffic flow control method according to claim 1, wherein the determining, by the traffic flow control device, traffic command signaling based on the traffic control request signaling and traffic control phase information of a target intersection comprises:

when a traffic control phase corresponding to the traffic control phase information of the target intersection is a green-go phase, and a remaining time of the green-go phase is longer than or equal to the first time, determining, by the traffic flow control device, that the traffic command signaling is go command signaling, wherein the go command signaling comprises the traffic control phase information of the target intersection, information about the exit lane, and preset vehicle speed at the target intersection.

6. The traffic flow control method according to claim 1, wherein the determining, by the traffic flow control device, traffic command signaling based on the traffic control request signaling and traffic control phase information of a target intersection comprises:

after the traffic flow control device determines the first time, when a traffic control phase corresponding to the traffic control phase information of the target intersection is a green-go phase, determining, by the traffic flow control device, that the traffic command signaling is go command signaling, wherein the go command signaling comprises the traffic control phase information of the target intersection obtained after the first time is determined and information about the exit lane; or after the traffic flow control device determines the first time, when a traffic control phase corresponding to the traffic control phase information of the target intersection is a red-stop phase, determining, by the traffic flow control device, that the traffic command signaling is stop command signaling, wherein the stop command signaling comprises the traffic control phase information of the target intersection obtained after the first time is determined and location information of the stopline of the current lane.

7. The traffic flow control method according to claim 1, wherein the determining, by the traffic flow control device, traffic command signaling based on the traffic control request signaling and traffic control phase information of a target intersection comprises:

after the traffic flow control device determines the first time, when a traffic control phase corresponding to the traffic control phase information of the target intersection is a green-go phase, determining, by the traffic flow control device, that the traffic command signaling is go command signaling, wherein the go command signaling comprises the traffic control phase information of the target intersection obtained after the first time is determined, a preset vehicle speed at the target intersection, and information about the exit lane; or after the traffic flow control device determines the first time, when a traffic control phase corresponding to the traffic control phase information of the target intersection is a red-stop phase, determining, by the traffic flow control device, that the traffic command signaling is stop command signaling, wherein the stop command signaling comprises the traffic control phase information of the target intersection obtained after the first time is determined, the preset vehicle speed at the target intersection, and location information of the stopline of the current lane.

8. The traffic flow control method according to claim wherein the determining, by the traffic flow control device, an entrance lane and an exit lane of the first vehicle at the target intersection based on the travel information, the travel intention, lane information of the target intersection, and traffic flow information of the target intersection comprises:

determining, by the traffic flow control device, a plurality of entrance lanes based on the travel intention and the lane information of the target intersection;

determining, by the traffic flow control device, the entrance lane from the plurality of entrance lanes based on the traffic flow information of the target intersection and the current lane, wherein the current lane is obtained by the traffic flow control device through calculation based on the location of the first vehicle and the lane information of the target intersection, or the current lane is carried in the travel information;

determining, by the traffic flow control device, a plurality of exit lanes based on the travel intention and the lane information of the target intersection; and determining, by the traffic flow control device, the exit lane from the plurality of exit lanes based on the traffic flow information of the target intersection and the entrance lane.

9. The traffic flow control method according to claim 1, wherein the traffic control phase information of the target intersection is traffic control phase information that is obtained by the traffic flow control device from a traffic signal light of the target intersection, or is traffic control phase information that is generated by the traffic flow control device.

10. A traffic flow control method in an internet of vehicles, comprising:

receiving, by a traffic flow control device, traffic control request signaling sent by an in-vehicle device of a first vehicle, wherein the traffic control request signaling comprises travel information and a travel intention of the first vehicle;

determining, by the traffic flow control device, traffic command signaling based on the traffic control request signaling and traffic control phase information of a target intersection through which the first vehicle is to pass;

sending, by the traffic flow control device, the traffic command signaling to the in-vehicle device; and determining, by the traffic flow control device, an entrance lane of the first vehicle at the target intersection based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes;

determining, by the traffic flow control device, an exit lane of the first vehicle at the target intersection based on the travel information, the travel intention, and lane information of the target intersection, wherein, the lane information includes data identifying a plurality of second lanes to exit the area within the target intersection, and the exit lane is allocated by the traffic flow control device to the first vehicle from the plurality of second lanes; or determining, by the traffic flow control device, an entrance lane and an exit lane of the first vehicle at the target intersection based on the travel information, the travel intention lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated by the traffic flow control device to the first vehicle from the plurality of first lanes and the exit lane is allocated by the traffic flow control device to the first vehicle from the plurality of second lanes, wherein the determining, by the traffic flow control device, traffic command signaling based on the traffic control request signaling and traffic control phase information of a target intersection comprises;

when a traffic control phase corresponding to current traffic control phase information of the target intersection is a red-stop phase, determining by the traffic flow control device, that the traffic command signaling is first stop command signaling, wherein the first stop command signaling comprises the traffic control phase information of the target intersection and location information of a stopline of a current lane, and the current lane is obtained by the traffic flow control device through calculation based on a location of the first vehicle and the lane information of the target intersection, or the current lane is carried in the travel information, and, wherein the traffic flow control method further comprises:

when the traffic control phase corresponding to the traffic control phase information of the target intersection switches to a green-go phase, and the traffic flow control device learns through monitoring that the first vehicle has traveled to the stopline, sending, by the traffic flow control device, go command signaling to the in-vehicle device, wherein the go command signaling comprises the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at a current speed and acceleration of the first vehicle along the current lane is shorter than or equal to a remaining time of the green-go phase, sending, by the traffic flow control device, go command signaling to the in-vehicle device, wherein the go command signaling comprises the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at a current speed and acceleration of the first vehicle along the current lane is longer than a remaining time of the green-go phase, sending, by the traffic flow control device, second stop command signaling to the in-vehicle device, wherein the second stop command signaling comprises the traffic control phase information of the target intersection and location information of the stopline of the current lane.

11. A traffic flow control method in an internet of vehicles, comprising:
receiving, by a traffic flow control device, traffic control request signaling sent by an in-vehicle device of a first vehicle, wherein the traffic control request signaling comprises travel information and a travel intention of the first vehicle;

determining, by the traffic flow control device, traffic command signaling based on the traffic control request signaling and traffic control phase information of a target intersection through which the first vehicle is to pass;

sending, by the traffic flow control device, the traffic command signaling to the in-vehicle device; and determining, by the traffic flow control device, an entrance lane of the first vehicle at the target intersection based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes;

determining, by the traffic flow control device, an exit lane of the first vehicle at the target intersection based on the travel information, the travel intention, and lane information of the target intersection, wherein, the lane information includes data identifying a plurality of second lanes to exit the area within the target intersection, and the exit lane is allocated by the traffic flow control device to the first vehicle from the plurality of second lanes; or determining, by the traffic flow control device, an entrance lane and an exit lane of the first vehicle at the target intersection based on the travel information, the travel intention lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated by the traffic flow control device to the first vehicle from the plurality of first lanes and the exit lane is allocated by the traffic flow control device to the first vehicle from the plurality of second lanes, wherein the travel information comprises a location of the first vehicle; and determining, by the traffic flow control device, a first time based on a preset vehicle speed at the target intersection, the location of the first vehicle, and a current lane in which the first vehicle is located, wherein the first time is a time required for the first vehicle to travel off a stopline of the current lane from the location of the first vehicle along the current lane, and the current lane is obtained by the traffic flow control device through calculation based on the location of the first vehicle and the lane information of the target intersection, or the current lane is carried in the travel information, wherein the determining, by the traffic flow control device, traffic command signaling based on the traffic control request signaling and traffic control phase information of a target intersection comprises, when a traffic control phase corresponding to the traffic control phase information of the target intersection is a green-go phase, and a remaining time of the green-go phase is shorter than the first time, determining, by the traffic flow control device, that the traffic command signaling is first stop command signaling, wherein the first stop command signaling comprises the traffic control phase information of the target intersection, location information of the stopline of the current lane, and the preset vehicle speed at the target intersection, and wherein the traffic flow control method further comprises:

when the traffic control phase corresponding to the traffic control phase information of the target intersection switches again to the green-go phase, and the traffic flow control device learns through monitoring that the first vehicle has traveled to the stopline, sending, by the traffic flow control device, go command signaling to the in-vehicle device, wherein the go command signaling comprises the traffic control phase information of the target intersection, information about the exit lane, and the preset vehicle speed at the target intersection; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at the preset vehicle speed at the target intersection along the current lane is shorter than or equal to a remaining time of the green-go phase to which the traffic control phase switches again, sending, by the traffic flow control device, go command signaling to the in-vehicle device, wherein the go command signaling comprises the traffic control phase information of the target intersection, information about the exit lane, and the preset vehicle speed at the target intersection; or when the traffic control phase corresponding to the traffic control phase information of the target intersection switches again to the green-go phase, and the traffic flow control device learns through monitoring that a time required for the first vehicle to travel off the stopline of the current lane from a current location of the first vehicle at the preset vehicle speed at the target intersection along the current lane is longer than a remaining time of the green-go phase to which the traffic control phase switches again, sending, by the traffic flow control device, second stop command signaling to the in-vehicle device, wherein the second stop command signaling comprises the traffic control phase information of the target intersection, the location information of the stopline of the current lane, and the preset vehicle speed at the target intersection.

12. A traffic flow control method in an internet of vehicles, comprising:
receiving, by a traffic flow control device, traffic control request signaling sent by an in-vehicle device of a first vehicle, wherein the traffic control request signaling comprises travel information and a travel intention of the first vehicle;
determining, by the traffic flow control device, traffic command signaling based on the traffic control request signaling and traffic control phase information of a target intersection through which the first vehicle is to pass;
sending, by the traffic flow control device, the traffic command signaling to the in-vehicle device; and
determining, by the traffic flow control device, an entrance lane of the first vehicle at the target intersection based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes;
determining, by the traffic flow control device, an exit lane of the first vehicle at the target intersection based on the travel information, the travel intention, and lane information of the target intersection, wherein, the lane information includes data identifying a plurality of second lanes to exit the area within the target intersection, and the exit lane is allocated by the traffic flow control device to the first vehicle from the plurality of second lanes; or determining, by the traffic flow control device, an entrance lane and an exit lane of the first vehicle at the target intersection based on the travel information, the travel intention lane information of the target intersection, and traffic flow information of the target intersection, wherein the lane information includes data identifying the plurality of first lanes to enter an area within the target intersection and a plurality of second lanes to exit the area within the target intersection, and wherein the entrance lane is allocated by the traffic flow control device to the first vehicle from the plurality of first lanes and the exit lane is allocated by the traffic flow control device to the first vehicle from the plurality of second lanes, wherein the travel information comprises a location of the first vehicle; and determining, by the traffic flow control device, a first time based on a preset vehicle speed at the target intersection, the location of the first vehicle, and a current lane in which the first vehicle is located, wherein the first time is a time required for the first vehicle to travel off a stopline of the current lane from the location of the first vehicle along the current lane, and the current lane is obtained by the traffic flow control device through calculation based on the location of the first vehicle and the lane information of the target intersection, or the current lane is carried in the travel information, wherein the determining, by the traffic flow control device, traffic command signaling based on the traffic control request signaling and traffic control phase information of a target intersection comprises, when a traffic control phase corresponding to the traffic control phase information of the target intersection is a red-stop phase, determining, by the traffic flow control device, that the traffic command signaling is first stop command signaling, wherein the first stop command signaling comprises the traffic control phase information of the target intersection, location information of the stopline of the current lane, and the preset vehicle speed at the target intersection, and wherein the traffic flow control method further comprises:

when the traffic control phase corresponding to the traffic control phase information of the target intersection switches to a green-go phase, and the traffic flow control device learns through monitoring that the first vehicle has traveled to the stopline, sending, by the traffic flow control device, go command signaling to the in-vehicle device, wherein the go command signaling comprises the traffic control phase information of the target intersection, information about the exit lane, and the preset vehicle speed at the target intersection; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at the preset vehicle speed at the target intersection along the current lane is shorter than or equal to a remaining time of the green-go phase, sending, by the traffic flow control device, go command signaling to the in-vehicle device, wherein the go command signaling comprises the traffic control phase information of the target intersection, information about the exit lane, and the preset vehicle speed at the target intersection; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at the preset vehicle speed at the target intersection along the current lane is longer than a remaining time of the green-go phase, sending, by the traffic flow control device, second stop command signaling to the in-vehicle device, wherein the second stop command signaling comprises the traffic control phase information of the target intersection, the location information of the stopline of the current lane, and the preset vehicle speed at the target intersection.

13. A traffic flow control method in an internet of vehicles, comprising:

receiving, by a traffic flow control device, traffic control request signaling sent by an in-vehicle device of a first vehicle, wherein the traffic control request signaling comprises travel information and a travel intention of the first vehicle;

determining, by the traffic flow control device, traffic command signaling based on the traffic control request signaling and traffic control phase information of a target intersection through which the first vehicle is to pass;

sending, by the traffic flow control device, the traffic command signaling to the in-vehicle device; and determining, by the traffic flow control device, an entrance lane of the first vehicle at the target intersection based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes;

determining, by the traffic flow control device, an exit lane of the first vehicle at the target intersection based on the travel information, the travel intention, and lane information of the target intersection, wherein, the lane information includes data identifying a plurality of second lanes to exit the area within the target intersection, and the exit lane is allocated by the traffic flow control device to the first vehicle from the plurality of second lanes; or determining, by the traffic flow control device, an entrance lane and an exit lane of the first vehicle at the target intersection based on the travel information, the travel intention lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated by the traffic flow control device to the first vehicle from the plurality of first lanes and the exit lane is allocated by the traffic flow control device to the first vehicle from the plurality of second lanes, wherein the determining, by the traffic flow control device, traffic command signaling based on the traffic control request signaling and traffic control phase information of a target intersection comprises:

when a distance between the first vehicle and a second vehicle that travels ahead of the first vehicle and that is located in a current lane in which the first vehicle is located is less than a preset distance threshold, sending, by the traffic flow control device, follow command signaling to the in-vehicle device, wherein the follow command signaling comprises identification information of the second vehicle, and the current lane is obtained by the traffic flow control device through calculation based on a location of the first vehicle and the lane information of the target intersection, or the current lane is carried in the travel information.

14. The traffic flow control method according to claim 13, wherein the traffic flow control method further comprises:

when a traffic control phase corresponding to the traffic control phase information of the target intersection is a green-go phase, a time required for the second vehicle to travel off a stopline of the current lane from a current location of the second vehicle is shorter than or equal to a remaining time of the green-go phase, and a time required for the first vehicle to travel off the stopline of the current lane from a current location of the first vehicle is longer than the remaining time of the green-go phase, sending, by the traffic flow control device, stop command signaling to the in-vehicle device, wherein the stop command signaling comprises the traffic control phase information of the target intersection and location information of the stopline of the current lane.

15. The traffic flow control method according to claim 14, wherein the traffic flow control method further comprises:

when the traffic control phase corresponding to the traffic control phase information of the target intersection switches again to the green-go phase, and the traffic flow control device learns through monitoring that the first vehicle has traveled to the stopline of the current lane, sending, by the traffic flow control device, go command signaling to the in-vehicle device, wherein the go command signaling comprises the traffic control phase information of the target intersection and information about the exit lane.

16. A traffic flow control method in an internet of vehicles, comprising:

sending, by an in-vehicle device of a first vehicle, traffic control request signaling to a traffic flow control device, wherein the traffic control request signaling comprises travel information and a travel intention of the first vehicle, and the first vehicle is located within a management area of the traffic flow control device; and receiving, by the in-vehicle device, traffic command signaling sent by the traffic flow control device, so that the first vehicle travels according to the traffic command signaling, wherein the traffic command signaling is determined by the traffic flow control device based on the traffic control request signaling and traffic control phase information of a target intersection through which the first vehicle is to pass, wherein an entrance lane of the first vehicle at the target intersection is determined by the traffic flow control device based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes, wherein an exit lane of the first vehicle at the target intersection is determined, by the traffic flow control device, based on the travel information, the travel intention, and lane information of the target intersection, wherein the lane information includes data identifying a plurality of second lanes to exit the area within the target intersection, and the exit lane is allocated by the traffic flow control device to the first vehicle from the plurality of second lanes; or wherein an entrance lane and an exit lane of the first vehicle at the target intersection are determined, by the traffic flow control device, based on the travel information, the travel intention, lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated by the traffic flow control device to the first vehicle from the plurality of the first lanes and the exit lane is allocated by the traffic flow control device to the first vehicle from the plurality of second lanes, wherein the determining, by the traffic flow control device, traffic command signaling is determined based on the traffic control request signaling and traffic control phase information of a target intersection comprises:

when a traffic control phase corresponding to current traffic control phase information of the target intersection is a red-stop phase, determining, by the traffic flow control device, that the traffic command signaling is first stop command signaling, wherein the first stop command signaling comprises the traffic control phase information of the target intersection and location information of a stopline of a current lane, and the current lane is obtained by the traffic flow control device through calculation based on a location of the first vehicle and the lane information of the target intersection, or the current lane is carried in the travel information, and wherein the traffic flow control method further comprises:

when the traffic control phase corresponding to the traffic control phase information of the target intersection switches to a green-go phase, and the traffic flow control device learns through monitoring that the first vehicle has traveled to the stopline, sending, by the traffic flow control device, go command signaling to the in-vehicle device, wherein the go command signaling comprises the traffic control phase information of the target intersection and information about the exit lane, or when the traffic control phase corresponding to the traffic control phase information of the target intersection switches to a green-go phase, and the traffic flow control device learns through monitoring that at a time required for the first vehicle to travel off the stopline of the current lane from a current location of the first vehicle at a current speed and acceleration of the first vehicle along the current lane is shorter than or equal to a remaining time of the green-go phase, sending, by the traffic flow control device, go command signaling to the in-vehicle device, wherein the go command signaling comprises the traffic control phase information of the target intersection and information about the exit lane, or when the traffic control phase corresponding to the traffic control phase information of the target intersection switches to a green-go phase, and the traffic flow control device learns through monitoring that at a time required for the first vehicle to travel off the stopline of the current lane from a current location of the first-vehicle at a current speed and acceleration of the first vehicle along the current lane is longer than a remaining time of the green-go phase, sending, by the traffic flow control device, second stop command signaling to the in-vehicle device, wherein the second stop command signaling comprises the traffic control phase information of the target intersection and location information of the stopline of the current lane.

17. A traffic flow control device in an internet of vehicles, comprising:
a receiver, configured to receive traffic control request signaling sent by an in-vehicle device of a first vehicle, wherein the traffic control request signaling comprises travel information and a travel intention of the first vehicle;
a processor, configured to determine traffic command signaling based on the traffic control request signaling and traffic control phase information of a target intersection through which the first vehicle is to pass; and
a transmitter, configured to send the traffic command signaling to the in-vehicle device, wherein the processor is configured to determine an entrance lane of the first vehicle at the target intersection based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes, wherein the processor is configured to:
determine an exit lane of the first vehicle at the target intersection based on the travel information, the travel intention, and lane information of the target intersection, wherein the lane information includes data identifying a plurality of second lanes to exit the area within the target intersection, and the exit lane is allocated by the traffic flow control device to the first vehicle from the plurality of second lanes; or
determine an entrance lane and an exit lane of the first vehicle at the target intersection based on the travel information, the travel intention, lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated to the first vehicle from the plurality of first lanes and the exit lane is allocated to the first vehicle from the plurality of second lanes, wherein the travel information comprises a location of the first vehicle and a speed of the first vehicle; and
determine a first time based on the speed of the first vehicle, the location of the first vehicle, and a current lane in which the first vehicle is located, wherein the first time is a time required for the first vehicle to travel off a stopline of the current lane from the location of the first vehicle and the lane information of the target intersection, or the current lane is carried in the travel information, wherein the determining traffic command signaling based on the traffic control request signaling and traffic control phase information of a target intersection comprises:
when a traffic control phase corresponding to the traffic control phase information of the target intersection is a green-go phase, and a remaining time of the green-go phase is shorter than the first time, determining that the traffic command signaling is first stop command signaling, wherein the first stop command signaling comprises the traffic control phase information of the target intersection and location information of the stopline of the current lane, and
when the traffic control phase corresponding to the traffic control phase information of the target intersection switches again to the green-go phase, and the traffic flow control device learns through monitoring that the first vehicle has traveled to the stopline, sending go command signaling to the in-vehicle device, wherein the go command signaling comprises the traffic control phase information of the target intersection and information about the exit lane, or
when the traffic control phase corresponding to the traffic control phase information of the target intersection switches again the green-go phase, and the traffic flow control device learns through monitoring that a time required for the first vehicle to travel off the stopline of the current lane from a current location of the first vehicle at a current speed and acceleration of the first vehicle along the current lane is shorter than or equal to a remaining time of the green-go phase to which the traffic control phase switches again, sending go command signaling to the in-vehicle device, wherein the go command signaling comprises the traffic control phase information of the target intersection and information about the exit lane; or
when the traffic control phase corresponding to the traffic control phase information of the target intersection switches again to the green-go phase, and the processor learns through monitoring that a time required for the first vehicle to travel off the stopline of the current lane from a current location of the first vehicle at a current speed and acceleration of the first vehicle along the current lane is longer than a remaining time of the green-go phase to which the traffic control phase switches again, sending second stop command signaling to the in-vehicle device, wherein the second stop command signaling comprises the traffic control phase information of the target intersection and the location information of the stopline of the current lane.

18. An in-vehicle device in an internet of vehicles, comprising:
a transmitter, configured to send traffic control request signaling to a traffic flow control device, wherein the traffic control request signaling comprises travel information and a travel intention of a first vehicle, and the first vehicle is located within a management area of the traffic flow control device; and
a receiver, configured to receive traffic command signaling sent by the traffic flow control device, so that the first vehicle travels according to the traffic command signaling, wherein the traffic command signaling is determined by the traffic flow control device based on the traffic control request signaling and traffic control phase information of a target intersection through which the first vehicle is to pass, wherein an entrance lane of the first vehicle at the target intersection is determined by the traffic flow control device based on the travel information, the travel intention, and lane information of the target intersection, wherein the lane information includes data identifying a plurality of first lanes to enter an area within the target intersection, and wherein the entrance lane is allocated by the traffic flow control device to the first vehicle from the plurality of first lanes, wherein an exit lane of the first vehicle at the target intersection is determined, by the traffic flow control device, based on the travel information, the travel intention, and lane information of the target intersection, wherein the lane information includes data identifying a plurality of second lanes to exit the area within the target intersection, and the exit lane is allocated by the traffic flow control device to the first vehicle from the plurality of second lanes; or
wherein an entrance lane and an exit lane of the first vehicle at the target intersection are determined, by the traffic flow control device, based on the travel information, the travel intention, lane information of the target intersection, and traffic flow information of the target intersection, wherein the lane information includes data identifying a plurality of first lanes to enter an area within the target intersection and the plurality of second lanes to exit the area within the target intersection, and wherein the entrance lane is allocated by the traffic flow control device to the first vehicle from the plurality of first lanes and the exit lane is allocated by the traffic flow control device to the first vehicle from the plurality of second lanes, wherein the determining, by the traffic flow control device, traffic command signaling is determined based on the traffic control request signaling and traffic control phase information of a target intersection comprises:
when a traffic control phase corresponding to current traffic control phase information of the target intersection is a red-stop phase, determining, by the traffic flow control device, that the traffic command signaling is first stop command signaling, wherein the first stop command signaling comprises the traffic control phase information of the target intersection and location information of a stopline of a current lane, and the current lane is obtained by the traffic flow control device through calculation based on a location of the first vehicle and the lane information of the target intersection, or the current lane is carried in the travel information, and wherein the traffic flow control method further comprises:
when the traffic control phase corresponding to the traffic control phase information of the target intersection switches to a green-go phase, and the traffic flow control device learns through monitoring that the first vehicle has traveled to the stopline, sending, by the traffic flow control device, go command signaling to the in-vehicle device, wherein the go command signaling comprises the traffic control phase information of the target intersection and information about the exit lane; or
when the traffic control phase corresponding to the traffic control phase information of the target intersection switches to a green-go phase, and the traffic flow control device learns through monitoring that a time required for the first vehicle to travel off the stopline of the current lane from a current location of the first vehicle at a current speed and acceleration of the first vehicle along the current lane is shorter than or equal to a remaining time of the green-go phase, sending by the traffic flow control device, go command signaling to the in-vehicle device, wherein the go command signaling comprises the traffic control phase information of the target intersection and information about the exit lane; or when the traffic control phase corresponding to the traffic control phase information of the target intersection switches to a green-go phase, and the traffic flow control device learns through monitoring that a time required for the first vehicle to travel off the stopline of the current lane from a current location of the first vehicle at a current speed and acceleration of the first vehicle along the current lane is longer than a remaining time of the green-go phase, sending, by the traffic flow control device, second stop command signaling to the in-vehicle device, wherein the second stop command signaling comprises the traffic control phase information of the target intersection and location information of the stopline of the current lane.

* * * * *

UNITED STATES PATENT AND TRADEMARK OFFICE
CERTIFICATE OF CORRECTION

| | | |
|---|---|---|
| PATENT NO. | : 11,557,202 B2 | Page 1 of 2 |
| APPLICATION NO. | : 16/872608 | |
| DATED | : January 17, 2023 | |
| INVENTOR(S) | : Fuxiang Xiong, Hui Li and Jianli Zhou | |

It is certified that error appears in the above-identified patent and that said Letters Patent is hereby corrected as shown below:

In the Claims

In Claim 1, Column 39, Line 11, delete "travel intention lane information of the target" and insert --travel intention, lane information of the target--.

In Claim 1, Column 39, Line 38, delete "comprises;" and insert --comprises:--.

In Claim 1, Column 39, Line 53, delete "stopline, sending by the" and insert --stopline, sending, by the--.

In Claim 1, Column 40, Line 1, delete "switches again, sending" and insert --switches again, sending,--.

In Claim 4, Column 40, Line 49, delete "to claim wherein" and insert --to claim 1 wherein--.

In Claim 5, Column 41, Line 9, delete "exit lane, and present" and insert --exit lane, and a present--.

In Claim 8, Column 41, Line 62, delete "to claim wherein" and insert --to claim 1 wherein--.

In Claim 10, Column 42, Line 61, delete "travel intention lane information" and insert --travel intention, lane information--.

In Claim 10, Column 43, Line 7-8, delete "com-prises;" and insert --com-prises:--.

In Claim 10, Column 43, Line 11, delete "red-stop phase, determining by the" and insert --red-stop phase, determining, by the--.

In Claim 11, Column 44, Line 29, delete "travel intention lane information" and insert --travel intention, lane information--.

Signed and Sealed this
Eighteenth Day of April, 2023

Katherine Kelly Vidal
*Director of the United States Patent and Trademark Office*

CERTIFICATE OF CORRECTION (continued)
U.S. Pat. No. 11,557,202 B2

In Claim 11, Column 44, Line 55, delete "comprises," and insert --comprises:--.

In Claim 12, Column 46, Line 11, delete "travel intention lane information" and insert --travel intention, lane information--.

In Claim 12, Column 46, Line 14, delete "the plurality" and insert --a plurality--.

In Claim 12, Column 46, Line 15, delete "a plurality" and insert --the plurality--.

In Claim 12, Column 46, Line 37, delete "comprises," and insert --comprises:--.

In Claim 13, Column 47, Line 34, delete "device; and" and insert --device;--.

In Claim 13, Column 47, Line 56, delete "travel intention lane information" and insert --travel intention, lane information--.

In Claim 16, Column 49, Line 23, delete "plurality of the first lanes" and insert --plurality of first lanes--.

In Claim 16, Column 49, Line 52, delete "exit lane," and insert --exit lane;--.

In Claim 16, Column 49, Line 57, delete "that at a time" and insert --that a time--.

In Claim 16, Column 49, Line 66, delete "exit lane," and insert --exit lane;--.

In Claim 16, Column 50, Line 4, delete "that at a time" and insert --that a time--.

In Claim 17, Column 50, Line 65, delete "first vehicle and the" and insert --first vehicle along the current lane, and the current lane is obtained through calculation based on the location of the first vehicle and the lane--.

In Claim 17, Column 51, Line 21, delete "exit lane, or" and insert --exit lane; or--.

In Claim 17, Column 51, Line 24, delete "switches again the green-go phase" and insert --switches again to the green-go phase--.

In Claim 18, Column 52, Line 66, delete "green-go phase, sending by" and insert --green-go phase, sending, by--.